US012736361B2

(12) United States Patent
Pedersen

(10) Patent No.: US 12,736,361 B2
(45) Date of Patent: Sep. 15, 2026

(54) SYSTEMS AND METHODS USING ARTIFICIAL INTELLIGENCE FOR ROUTING ELECTRIC VEHICLES

(71) Applicant: Robert D. Pedersen, Dallas, TX (US)

(72) Inventor: Robert D. Pedersen, Dallas, TX (US)

( * ) Notice: Subject to any disclaimer, the term of this patent is extended or adjusted under 35 U.S.C. 154(b) by 49 days.

(21) Appl. No.: 18/977,664

(22) Filed: Dec. 11, 2024

(65) Prior Publication Data

US 2025/0109957 A1 Apr. 3, 2025

Related U.S. Application Data

(63) Continuation of application No. 18/438,443, filed on Feb. 10, 2024, now Pat. No. 12,203,766, which is a (Continued)

(51) Int. Cl.
*G01C 21/00* (2006.01)
*B60L 58/12* (2019.01)
(Continued)

(52) U.S. Cl.
CPC .......... *G01C 21/3492* (2013.01); *B60L 58/12* (2019.02); *B60L 58/16* (2019.02);
(Continued)

(58) Field of Classification Search
None
See application file for complete search history.

(56) References Cited

U.S. PATENT DOCUMENTS 6,487,477 B1 11/2002 Woestman et al.
8,170,737 B2 5/2012 Tate, Jr.
(Continued)

FOREIGN PATENT DOCUMENTS

CA 3230281 4/2023
CN 109501630 3/2019
CN 111291920 6/2020

OTHER PUBLICATIONS

Baouche, et. al., "Efficient Allocation of Electric Vehicles Charging Stations: Optimization Model and Application to a Dense Urban Network," IEEE Intelligent Transportation Systems Magazine, Fall 2014.

(Continued)

*Primary Examiner* — Jonathan M Dager
(74) *Attorney, Agent, or Firm* — Steven R. Pedersen

(57) ABSTRACT

The present invention provides systems, methods and algorithms based on specifically programed computer artificial intelligence expert system technology for determination of preferred routes of travel for electric vehicles (EVs). The systems, methods and algorithms provide such route guidance for battery-operated EVs in-route to a desired destination, but lacking sufficient battery energy to reach the destination from the current location of the EV. Such specifically programmed computer machines may be located in the EV and/or cloud-based or remote computer/data processing systems for the determination of preferred routes of travel, including intermediate stops at designated battery charging or replenishing stations. Expert system algorithms operating on combinations of expert defined parameter subsets for route selection are disclosed. Specific fuzzy logic methods are also disclosed for route evaluation and selection of a particular route. Application of the present invention systems and methods to autonomous or driver-less EVs is also disclosed.

20 Claims, 13 Drawing Sheets

Related U.S. Application Data continuation of application No. 17/862,344, filed on Jul. 11, 2022, now Pat. No. 11,920,943, which is a continuation of application No. 17/227,184, filed on Apr. 9, 2021, now Pat. No. 11,422,000, which is a continuation of application No. 17/087,412, filed on Nov. 2, 2020, now Pat. No. 11,002,557, which is a continuation of application No. 16/299,673, filed on Mar. 12, 2019, now Pat. No. 10,866,108, which is a continuation of application No. 15/439,673, filed on Feb. 22, 2017, now Pat. No. 10,288,439.

(51) Int. Cl.

| | |
|---|---|
| ***B60L 58/16*** | (2019.01) |
| ***G01C 21/34*** | (2006.01) |
| ***G05D 1/00*** | (2006.01) |
| ***G05D 1/227*** | (2024.01) |
| ***G05D 1/228*** | (2024.01) |
| ***G05D 1/247*** | (2024.01) |
| ***G05D 1/248*** | (2024.01) |
| ***G05D 1/644*** | (2024.01) |
| ***G06N 5/048*** | (2023.01) |
| *G08G 1/0968* | (2006.01) |

(52) U.S. Cl.

CPC ....... *G01C 21/343* (2013.01); *G01C 21/3469* (2013.01); *G01C 21/3476* (2013.01); *G05D 1/0217* (2013.01); *G05D 1/0278* (2013.01); *G05D 1/0285* (2013.01); *G05D 1/227* (2024.01); *G05D 1/228* (2024.01); *G05D 1/247* (2024.01); *G05D 1/248* (2024.01); *G05D 1/644* (2024.01); *G06N 5/048* (2013.01); *B60L 2240/622* (2013.01); *B60L 2240/64* (2013.01); *B60L 2240/66* (2013.01); *B60L 2240/68* (2013.01); *B60L 2240/72* (2013.01); *B60L 2250/10* (2013.01); *B60L 2250/16* (2013.01); *G08G 1/096811* (2013.01); *G08G 1/096833* (2013.01); *Y02T 10/70* (2013.01); *Y02T 90/16* (2013.01); *Y02T 90/167* (2013.01); *Y04S 30/12* (2013.01)

(56) References Cited

U.S. PATENT DOCUMENTS 8,538,694 B2* 9/2013 Conway ........... G08G 1/096838 701/123
8,880,238 B2 11/2014 Reich
8,965,669 B2 2/2015 Fisher
9,026,347 B2 5/2015 Gadh
9,103,686 B2 8/2015 Pedersen
9,112,382 B2 8/2015 Paul
9,156,369 B2 10/2015 Loftus
9,170,118 B2 10/2015 Kiyama
9,199,548 B2 12/2015 Hyde et al.
9,299,093 B2* 3/2016 Kidston ................. G06Q 30/04
9,302,594 B2 4/2016 Tripathi
9,333,873 B2 5/2016 Mori et al.
9,335,179 B2 5/2016 Penilla et al.
9,346,365 B1 5/2016 Penilla
9,610,853 B1 4/2017 Miller
9,713,962 B2* 7/2017 Payne ..................... B60L 53/62
9,714,837 B2 7/2017 North
9,739,624 B2 8/2017 Rajagopalan
10,372,142 B2 8/2019 Venturelli
10,621,872 B2* 4/2020 Shimizu ................. G08G 1/205
10,866,108 B2 12/2020 Pedersen
11,002,557 B2 5/2021 Pedersen
11,422,000 B2 8/2022 Pedersen
11,920,943 B2 3/2024 Pedersen
2004/0022416 A1 2/2004 Lemelson
2006/0129313 A1 6/2006 Becker
2008/0319597 A1 12/2008 Yamada
2009/0063680 A1 3/2009 Bridges
2009/0312903 A1 12/2009 Hafner
2010/0114798 A1 5/2010 Sirton
2011/0022254 A1 1/2011 Johas Teener
2011/0160992 A1 6/2011 Crombez
2011/0191220 A1 8/2011 Kidston
2011/0288765 A1 11/2011 Conway
2011/0301806 A1* 12/2011 Messier ............. G01C 21/3484 701/423
2012/0109519 A1* 5/2012 Uyeki ..................... B60L 53/68 701/426
2012/0136574 A1 5/2012 Kobayashi
2012/0166012 A1 6/2012 Lee
2012/0179323 A1 7/2012 Profitt-Brown
2012/0179359 A1 7/2012 Profitt-Brown
2012/0296678 A1 11/2012 Boot
2013/0009765 A1 1/2013 Gilman
2013/0041850 A1 2/2013 LaFrance
2013/0138542 A1 5/2013 Sirton
2013/0226441 A1* 8/2013 Horita ................ G01C 21/3469 701/117
2013/0339072 A1 12/2013 Touge
2013/0346902 A1 12/2013 Epstein
2014/0032034 A1 1/2014 Raptopoulos
2014/0052373 A1 2/2014 Hoch
2014/0142770 A1 5/2014 Sellschopp
2014/0188304 A1 7/2014 Richter
2014/0278104 A1 9/2014 Proietty
2014/0354228 A1 12/2014 Williams
2014/0371969 A1 12/2014 Asai
2014/0379183 A1 12/2014 Long
2015/0045985 A1 2/2015 Yenamandra
2015/0081598 A1 3/2015 Depizzol
2015/0106001 A1 4/2015 Lee
2015/0149221 A1 5/2015 Tremblay
2015/0158486 A1 6/2015 Healey
2015/0226572 A1* 8/2015 North ................ G01C 21/3469 701/400
2015/0241233 A1 8/2015 Loftus
2015/0253144 A1 9/2015 Rau
2015/0266356 A1 9/2015 Ficher
2016/0052413 A1 2/2016 Shimizu
2016/0068121 A1 3/2016 Maini
2016/0075247 A1 3/2016 Uyeki
2016/0091338 A1 3/2016 Abuelsaad
2016/0126732 A1 5/2016 Uyeki
2016/0332616 A1 11/2016 Zhao
2017/0088000 A1* 3/2017 Payne ..................... B60L 53/64
2017/0245127 A1 8/2017 Pedersen
2017/0262790 A1 9/2017 Khasis
2017/0282736 A1* 10/2017 Goei .................. G01C 21/3469
2017/0372431 A1 12/2017 Perl
2018/0017399 A1 1/2018 Rolnik
2018/0035606 A1 2/2018 Burdoucci
2018/0086264 A1 3/2018 Pedersen
2018/0173219 A1 6/2018 Lee
2018/0174449 A1 6/2018 Nguyen
2018/0238698 A1 8/2018 Pedersen
2019/0107406 A1* 4/2019 Cox ........................ G01S 19/42
2019/0114564 A1 4/2019 Ferguson
2019/0294173 A1 9/2019 Szubbocsev
2020/0101976 A1 4/2020 Cella
2020/0103244 A1 4/2020 Cella
2020/0104966 A1 4/2020 Cella
2021/0048818 A1 2/2021 Funke
2021/0231450 A1 7/2021 Pedersen
2021/0272394 A1 9/2021 Cella
2023/0038012 A1* 2/2023 Erozlu ............... G01C 21/3679
2024/0067031 A1* 2/2024 Meroux ................. G06N 20/00
2024/0149719 A1* 5/2024 Ropel ................... B60L 53/305
2024/0167831 A1* 5/2024 Swartz ............... G01C 21/3469
2024/0217371 A1* 7/2024 Calabro .................. B60L 58/14
2024/0361137 A1* 10/2024 Aviv .................. G01C 21/3469
2024/0391352 A1* 11/2024 Abbaraju ........... G01R 31/3648
2025/0128632 A1* 4/2025 Calabro .................. B60L 53/63
2025/0256605 A1* 8/2025 Gaither ................... B60L 53/62
2026/0054596 A1* 2/2026 Ropel ................... B60L 53/665

(56) References Cited

U.S. PATENT DOCUMENTS

OTHER PUBLICATIONS

Chen, C.H., "Fuzzy Logic and Neural Network Handbook," McGraw-Hill, New York, 1996.
Cox, C., "The Fuzzy Systems Handbook," Academic Press Inc., 1994.
Denton, "Electric and Hybrid Vehicles," Routledge, 2016.
Giarrantano et al; Expert Systems Principles and Programming; Fourth Edition; 433 pages; Course Technology; Thomson Learning, Inc.; 2005; CA.
Horiba, "Lithium-Ion Battery Systems," Proceeding of the IEEE, Jun. 2014, pp. 939-950.
Pourazarm, et. al., "Optimal Routing of Electric Vehicles in Networks with Charging Nodes: A Dynamic Programming Approach," IEEE Electronic Vehicle Conference, 2014.
Prasanth, et. al. "Green Energy based Inductive Self-Healing Highways of the Future," IEEE Transportation Electrification Conference and Expo (ITEC), 2016.
Shinohara, "Wireless Power Transfer via Radio Waves," John Wiley and Sons, 2014.
Tianheng, et. al., "A Supervisory Control Strategy for Plug-In Hybrid Electric Vehicles Based on Energy Demand Prediction and Route Preview," IEEE Transactions on Vehicular Technology, May 2015, pp. 1691-1700.
Yang, et. al., "Electric Vehicle Navigation System Based on Power Consumption," IEEE Transactions on Vehicular Technology, 2015.

* cited by examiner

CLOUD CONTROL UNIT 500
PROCESSOR
501
MEMORY
502
DISPLAY
503
ARTIFICIAL INTELLIGENCE /FUZZY LOGIC
504
POWER
505
510
510
WORLD WIDE WEB (WWW) INTERNET TRANSCEIVERS
506
GSM/CDMA CELLULAR TELEPHONE TRANSCEIVERS
507
WIFI TRANSCEIVER
508
BLUETOOTH TRANSCEIVER
509

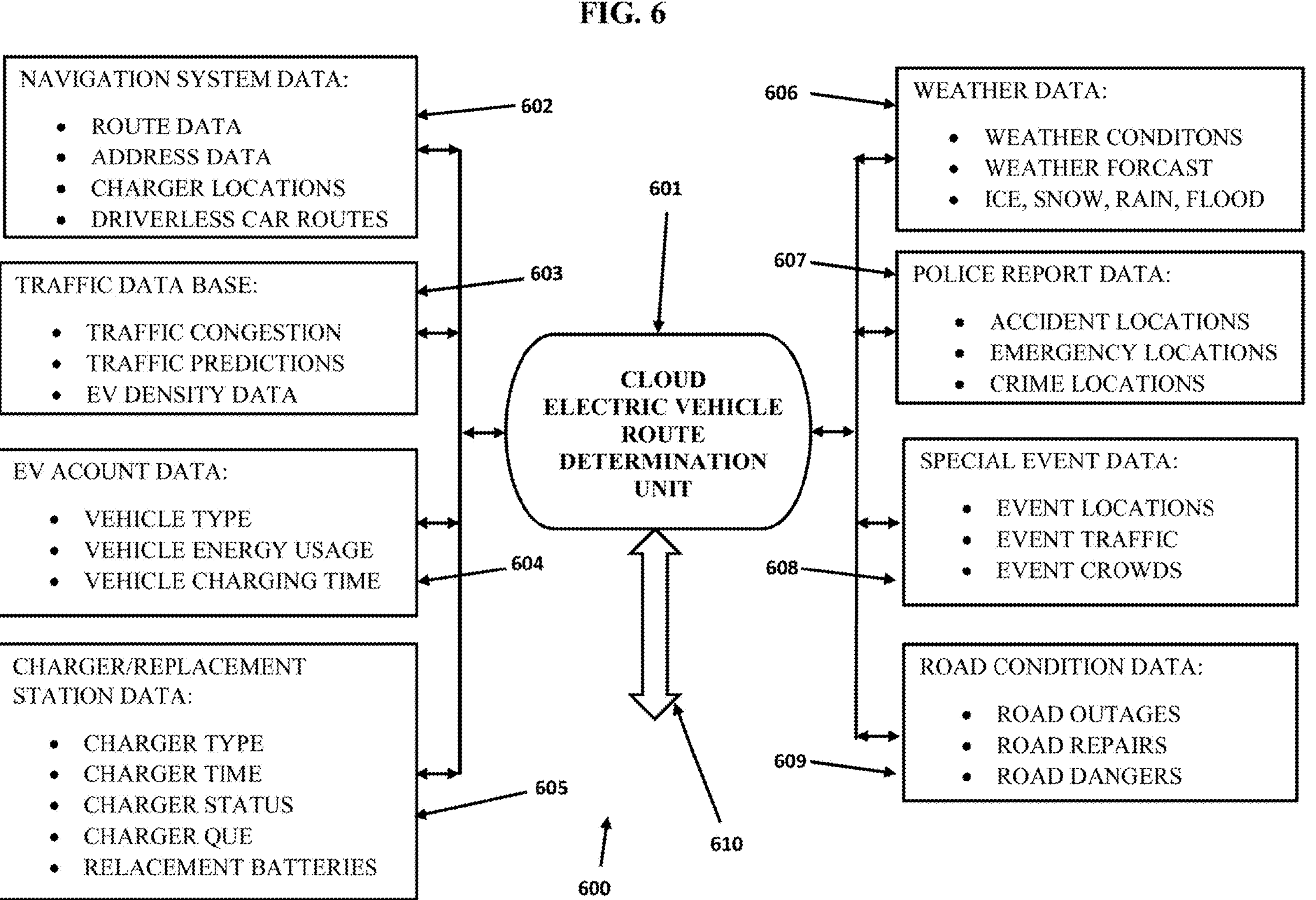
FIG. 6
NAVIGATION SYSTEM DATA:
• ROUTE DATA
• ADDRESS DATA
• CHARGER LOCATIONS
• DRIVERLESS CAR ROUTES
602
TRAFFIC DATA BASE:
• TRAFFIC CONGESTION
• TRAFFIC PREDICTIONS
• EV DENSITY DATA
603
EV ACOUNT DATA:
• VEHICLE TYPE
• VEHICLE ENERGY USAGE
• VEHICLE CHARGING TIME
604
CHARGER/REPLACEMENT STATION DATA:
• CHARGER TYPE
• CHARGER TIME
• CHARGER STATUS
• CHARGER QUE
• RELACEMENT BATTERIES
605
601
CLOUD ELECTRIC VEHICLE ROUTE DETERMINATION UNIT
610
600
606
WEATHER DATA:
• WEATHER CONDITONS
• WEATHER FORCAST
• ICE, SNOW, RAIN, FLOOD
607
POLICE REPORT DATA:
• ACCIDENT LOCATIONS
• EMERGENCY LOCATIONS
• CRIME LOCATIONS
SPECIAL EVENT DATA:
• EVENT LOCATIONS
• EVENT TRAFFIC
• EVENT CROWDS
608
ROAD CONDITION DATA:
• ROAD OUTAGES
• ROAD REPAIRS
• ROAD DANGERS
609

| TRAVEL TIME \ ENERGY NEEDED | VERY LOW | LOW | MEDIUM | HIGH | VERY HIGH |
|---|---|---|---|---|---|
| VERY LOW | VERY HIGH | HIGH | MEDIUM | LOW | LOW |
| LOW | HIGH | MEDIUM | MEDIUM | LOW | LOW |
| MEDIUM | MEDIUM | MEDIUM | MEDIUM | LOW | VERY LOW |
| HIGH | MEDIUM | LOW | LOW | VERY LOW | VERY LOW |
| VERY HIGH | LOW | LOW | LOW | VERY LOW | VERY LOW |

1200

1202
INPUT ROUTE SELECTION PARAMETERS
FUZZIFIER
1203
1206
EXPERT SYSTEM EV VEHICLE - ROUTING DATABASE
FUZZY LOGIC RULES
FUZZY LOGIC PROCESSING
1204
DEFUZZIFIER
1205
FUZZY LOGIC INFERENCE ENGINE 1201
ROUTE ADVISORY INDEX
1207

SYSTEMS AND METHODS USING ARTIFICIAL INTELLIGENCE FOR ROUTING ELECTRIC VEHICLES

CROSS-REFERENCE TO RELATED APPLICATIONS

This application is a continuation of U.S. Ser. No. 18/438,443 filed on Feb. 10, 2024, which is a continuation of U.S. Ser. No. 17/862,344 filed on Jul. 11, 2022, now U.S. Pat. No. 11,920,943 issued on Mar. 5, 2024, which is a continuation of U.S. Ser. No. 17/227,184 filed on Apr. 9, 2021, now U.S. Pat. No. 11,422,000 issued on Aug. 23, 2022, which is a continuation of U.S. Ser. No. 17/087,412 filed on Nov. 2, 2020, now U.S. Pat. No. 11,002,557 issued on May 11, 2021, which is a continuation of U.S. Ser. No. 16/299,673 filed on Mar. 12, 2019, U.S. Pat. No. 10,866,108 issued on Dec. 15, 2020, which is a continuation of U.S. Ser. No. 15/439,673 filed on Feb. 22, 2017, U.S. Pat. No. 10,288,439 issued on May 14, 2019, all of which are all incorporated herein by reference in their entirety.

BACKGROUND OF INVENTION

Concerns over the impact of the increasing use of fossil fuels on the environment have led to multiple initiatives to provide electric vehicles (EVs) for many modes of automotive transportation. Critical considerations include the design and implementation of EV automotive drive trains, battery technology suitable for powering EVs, technology for charging such batteries, and the impact of widespread use of EV's on power generation and distribution of power necessary to meet the demand that increased use of EV's will present. Another important consideration is the management of EV traffic flow on roadways and highways to ensure acceptable performance of automotive transportation with increased EV usage.

It has been estimated that the worldwide use of EV's reached around 700,000 in 2015 with 275,000 EV's in the United States. Commercial models include the Nissan LEAF and Chevrolet Volt. An important goal of EV programs is a reduction of air pollution caused by fossil fuel transportation means. EV offers several advantages, including lower $CO_2$ emissions, low petroleum usage and lower operating noise.

The price paid for these advantages is decreased automotive operating range. It has been reported that pure electric vehicles powered only by battery have a range of up to about 100 miles. Plug-in hybrid electric vehicles have a battery range of about 10 miles, but revert to a standard internal combustion engine when that range is reached. Extended range electric vehicles have a battery range of about 50 miles and include internal combustion engine driven generator to increase to increase that range. See, e.g., T. Denton, "Electric and Hybrid Vehicles," Routledge, 2016.

This limited driving range is a particular concern sometimes referred to as "range anxiety." Drivers are concerned that they may not have enough stored energy to reach their destination or even to carry out every day routine driving to and from multiple locations.

Lithium-ion technology is currently the preferred battery technology for EV's. Lithium-ion batteries have been the battery of choice for many consumer electronic products, including mobile cell phones, laptop computers and tablets. The automotive application is particularly challenging requiring system control technology that ensures safe operation and mechanical design to ensure proper operation in the hostile automotive environment. Thermal design considerations are important to keep operation within specified temperature ranges. See, id., and, e.g., T Horiba, "Lithium-Ion Battery Systems," Proceeding of the IEEE, June 2014, pp. 939-950.

Clearly, extending the range of EV's requires systems and methods for recharging or replacing of the vehicle batteries. Multiple considerations are involved and various alternatives exist for such charging. Most EV's are charged at home. Businesses may also offer charging stations for employees and/or visitors. Public charging stations along road ways are also being considered and in some cases implemented. AC charging is the standard charging method. Chargers may be based on single phase AC (alternating current), three phase AC or higher power DC (direct current) technology. Charging time for a 100-km range for lower power single phase AC systems has been reported at 6-8 hours. More powerful three phase AC systems may provide comparable charging in 20-30 minutes. High power DC systems may provide such charging in as little as 10 minutes. Multiple charging cable configurations have been standardized by the IEC (International Electrotechnical Commission). See, e.g., T. Denton, "Electric and Hybrid Vehicles," Routledge, 2016, pp. 107-110.

Another potential technology for EV battery charging is Wireless Power Transfer (WPT). Possible implementations include stationary WPT where the vehicle is parked and dynamic WPT for use along roadways when the vehicle is in motion. WPT relies upon magnetic induction and requires no cabling between the vehicle and the WPT charging mechanism. Charging is accomplished from a fixed or roadside primary coil to a secondary coil of a stationary or moving vehicle. See Id. pp. 116-122; see also, N. Shinohara, "Wireless Power Transfer via Radio Waves," John Wiley and Sons, 2014; see also V. Prasanth, et. al. "Green Energy based Inductive Self-Healing Highways of the Future," IEEE Transportation Electrification Conference and Expo (ITEC), 2016.

An important new development in automotive vehicle transportation is that of autonomous or driverless cars. Such driverless or self-driving cars are capable of sensing their environment and navigating with limited and sometimes no human driver control. Driverless cars make use of various technologies for sensing roadways, obstacles, traffic control signals, signage and other vehicles that may share a roadway being traveled. While such driverless vehicles are just now being introduced, predictions are that this mode of transportation will grow in the near future. EV driverless vehicles may require special considerations when choosing routes of travel to avoid more challenging roadways or congestion that may present difficult or more challenging sensory issues for the vehicle. Appropriate routes of travel for vehicles with drivers may not be appropriate for driverless vehicles. At the same time, the systems and methods of the present invention are applicable to such driverless vehicles with appropriate databases and navigation programs that account for the safety requirements of such vehicles.

The critical needs for improved systems and methods for managing charging of electric vehicles has led to various technological suggestions for allocation and placement of charging stations, integration with navigation systems, the use of Wireless Power Transfer (WPT), and the use of mathematical modeling of system design and operation. In addition to the above citations, exemplary prior art systems and methods attempting to address certain aspects these needs include the following:

1. Fouad Baouche, et. al., "Efficient Allocation of Electric Vehicles Charging Stations: Optimization Model and Application to a Dense Urban Network," IEEE Intelligent Transportation Systems Magazine, Fall 2014. This paper addresses the problem of optimizing the location of electric vehicle charging stations in a particular area such as the Lyon, France metropolitan area. The model purportedly includes trip OD mileage, vehicle energy consumption, and routing tools with elevation information parameters as inputs to an integer linear optimization program for the location of charging stations.

2. Jyun-Yan Yang, et. al., "Electric Vehicle Navigation System Based on Power Consumption," IEEE Transactions on Vehicular Technology, 2015. This paper purportedly describes an electric vehicle navigation system (EVNS) whose architecture is based on autonomic computing and hierarchical architecture proposed to improve the growing complexity of navigation systems. The electric vehicle sends the traffic information center (TIC) aggregated traffic information during a trip or a navigation request at the start of its travel. The TIC processes the traffic information and plans routes. The electric vehicle receives a suggested route that guides the driver. Traffic information, including state of charge (SOC), traffic flow, average speed, travel time, and vehicle route, is provided by the navigation systems.
3. Sepideh Pourazarm, et. al., "Optimal Routing of Electric Vehicles in Networks with Charging Nodes: A Dynamic Programming Approach," IEEE Electronic Vehicle Conference, 2014. This paper purportedly seeks to minimize the total elapsed time for vehicles to reach their destinations considering both traveling and recharging times at nodes using a dynamic programming approach when the vehicles do not have adequate energy for the entire journey.
4. Venugopal Prasanth, et. al. "Green Energy based Inductive Self-Healing Highways of the Future," IEEE Transportation Electrification Conference and Expo (ITEC), 2016. This paper investigates the use of Inductive Power Transfer (IPT) for recharging electric vehicles. The use of solar and wind energy to power such systems is discussed.
5. F. Tianheng, et. al., "A Supervisory Control Strategy for Plug-In Hybrid Electric Vehicles Based on Energy Demand Prediction and Route Preview," IEEE Transactions on Vehicular Technology, May 2015, pp. 1691-1700. This paper purportedly presents a supervisory control strategy for plug-in hybrid electric vehicles based on energy demand prediction and route preview. A neural network is used to predict the energy demand of the vehicle and an adaptive equivalent consumption minimization strategy is used to optimally distribute energy between the engine and the motor to achieve an optimal torque split.
6. U.S. Pat. No. 6,487,477, J. T Woestman, et. al. "Strategy to use an on-board navigation system for electric and hybrid electric vehicle energy management," Assignee—Ford Global Technologies, Inc., Nov. 26, 2002. This patent purportedly integrates an on-board navigation system to provide energy management for an electric vehicle (EV) and a hybrid electric vehicle (HEV). The vehicle location is continuously monitored, expectations of driver demand are determined, and vehicle accommodations are made. The system can be configured to include location data on road patterns, geography with date and time, altitude changes, speed limits, driving patterns of a vehicle driver, and weather. The vehicle accommodations can purportedly be configured to use discrete control laws, fuzzy logic, or neural networks.
7. U.S. Pat. No. 9,103,686, B. Pettersson, "Method and guidance-unit for guiding battery-operated transportation means to reconditioning stations," Assignee—LEICA GEOSYSTEMS AG, Aug. 11, 2015. This patent purportedly describes methods and apparatus for guiding a mobile transportation means of a set of transportation means to a selected reconditioning station of a set of reconditioning stations, comprising determining a position of the battery, determining a condition of the battery, forecasting a consumption characteristic of the transportation means, evaluating an achievable range of mobility of the transportation means, assigning the selected reconditioning station of the set of reconditioning stations, which is located within the range of mobility of the transportation means along a path to a desired target and guiding the transportation means to the selected reconditioning station. An optimization of the assignment and/or the path is executed by a search algorithm for assigning the set of transportation means to the set of reconditioning stations and batteries, based on actual and/or forecasted information about multiple entities of the sets of transportation means, stations and batteries as well as their conditions. In addition to the "search engine," the '686 Patent states: "For the optimization, certain conditions and aspects of the influencing parameters can be comprised by a usage of abstracted mathematical models of the underlying physical or logical background, which can be comprised in lookup tables, statistical, historical or forecasted data. Those models can be overall, global models of the behavior of the whole set of resources as well as models for subsystems such as e.g. a single battery or engine of a transportation means. For the modeling, a plurality of methods are known to a skilled person, as e.g. physical models, differential equations, Fuzzy-Logic models, logical models, statistics models, forecasting models, etc." See '686 Patent, 4:47-58.
8. U.S. Pat. No. 9,199,548, R. A. Hyde, et. al., "Communication and control regarding electricity provider for wireless electric vehicle electrical energy transfer," Assignee—Elwha LLC, Dec. 1, 2015. This patent purportedly describes a computationally implemented system and method that is designed to electronically assess electricity provider detail information associated with providing electrical energy to one or more electric vehicle wireless electrical energy chargers configured for wirelessly charging one or more electric vehicles with electrical energy from the one or more electric vehicle wireless electrical energy chargers to the one or more electric vehicles, the one or more electric vehicles including one or more electric motors to provide motive force for directionally propelling the one or more electric vehicles.
9. U.S. Pat. No. 9,333,873, K. Mori, et. al., "Electric motor vehicle management system," Assignee-Mitsubishi Electric Corporation, May 10, 2016. This patent purportedly describes an electric motor vehicle management system with a portable terminal that is owned by a user and is located in an electric motor vehicle and transmits vehicle condition information of the electric motor vehicle including position information of the portable terminal that has been detected by a position detector of the portable terminal to a vehicle condition receiver of an energy management system (EMS) installed in a customer. A battery charging-and-discharging plan creating unit of the EMS creates a charging and discharging plan for a battery through the use of the vehicle condition information of the electric motor vehicle. A charging and discharging device performs at least one of charging and discharging of the battery of the electric motor vehicle in accordance with the battery charging-and-discharging plan for the battery.

10. U.S. Pat. No. 9,335,179, A. Penilla, et. al., "Systems for providing electric vehicles data to enable access to charge stations," May 10, 2016. This patent purportedly describes a cloud system for interfacing with an electric vehicle, wherein the electric vehicle has a battery that is rechargeable. The electric vehicle further has an on-board computer and a wireless communication system that is interfaced with the on-board computer. The on-board computer is configured to monitor a charge level of the battery and display the level on a display screen of the electric vehicle. The electric vehicle has global positioning system (GPS) logic for identifying geo-location of the electric vehicle. The cloud system is configured to manage a user account for the electric vehicle and store data associated with the user account. The data includes information regarding charge parameters received from the user. The cloud system is thus configured to interface with on-board computer of the electric vehicle via the wireless communication system. The cloud system is configured to access information regarding charging stations that are available and send to the electric vehicle one or more options of charge stations in response to processing received geo-location of the electric vehicle and received data regarding the charge level of the battery of the electric vehicle and the charge parameters of the user. The charge stations presented as options are located along a driving path that is reachable before the charge level of the electric vehicle reaches an empty state.

Additional prior art directed to technologies useful in some embodiments of the present invention includes:

11. Chen, C. H., "Fuzzy Logic and Neural Network Handbook," McGraw-Hill, New York, 1996.
12. Cox, C., "The Fuzzy Systems Handbook," Academic Press Inc., 1994.

All of the above are incorporated herein by reference.

The above cited art demonstrates the industry recognition of the importance of deriving optimal routes of travel for Electric Vehicles (EVs) with the goal of improving EV operational usefulness through determination of preferred routes of travel wherein such preferred routes include intermediate charging or replacement of EV batteries as required. What is needed and is missing in the prior art are specific, more efficient routing algorithms that may be employed in real-time without excessive and complex computation and that consider multiple factors such as battery charging-replacement station locations, required time of travel, roadway conditions, traffic congestion, including congestion for charging stations and minimization of required energy usage to travel between EV changing positions and destination locations.

SUMMARY OF INVENTION

The present inventions relate to systems and methods for routing an Electric Vehicle (EV) from a current position to a destination. The systems and methods comprise one or more specifically programmed computer machines with artificial intelligence expert system battery energy management and navigation route control. Battery energy and route guidance parameter definitions, including range of parameter values and subsets of those defined ranges, are stored in electronic memory of one or more of the specifically programmed computer machines. Also stored in these machines are expert system propositional logic statements defining relationships between the battery energy parameters and route guidance parameters based on parameter membership in said subset ranges.

In addition, the systems and methods involve storing in electronic memory of one or more of the specifically programmed computer machines, one or more of: EV descriptive information, EV energy requirements, EV battery specification information and EV current position and the location of the destination of said EV. The systems and methods involve monitoring and storing in electronic memory of one or more specifically programed computer machines the status of the EV stored battery energy.

The execution of computer program codes of one or more specifically programed computer machines compares the current EV stored battery energy to one or more defined thresholds. If the battery energy is less than a selected threshold, information is transmitted from the EV to one or more cloud or remote computer/database processing systems. That information may include one or more of: EV descriptive information, EV energy requirements, EV battery specification information, EV stored battery energy status, EV current GPS position and the EV destination address location. Based on that information, the EV receives artificial intelligence expert system derived route guidance information for one or more potential routes of travel from one or more of cloud or remote computer/database processing systems. That received information may include information regarding one or more potential routes of travel for the EV to reach one or more battery charging-replacement stations, and after battery replenishment, to continue on to said destination.

Additional information may include information regarding one or more route parameters for each of the said potential routes. Particular potential routes of travel are evaluated by one or more of the specifically programmed computer machines with artificial intelligence expert system battery energy management and navigation route control. That evaluation is based at least in part on route guidance parameter membership in defined parameter subsets and artificial intelligence expert system propositional logic statements. A particular route is selected based on comparison of the results of the individual route evaluations for potential routes of travel based on the above received information.

In some embodiments, the evaluation and selection of particular routes of travel are executed by one or more specifically programed computer machine located in the EV with artificial intelligence expert system battery energy management and navigation route control.

In other embodiments, the evaluation and selection of particular routes of travel are executed by one or more specifically programed computer machines located in the EV together with specifically programed cloud-based or remote computer/data processing systems with artificial intelligence expert system battery management and navigation route control.

In the systems and methods of this invention, transmitted EV descriptive information may include one or more of: vehicle type, vehicle loaded weight and vehicle energy requirement history. The transmitted EV battery specification information may include one or more of: battery type, battery capacity, battery charging requirements, battery age and battery charging time.

In some embodiments, the route guidance parameters defined for each potential route of travel may include the expected total travel time from the current location to the destination including intermediate battery charging or replacement times along with the total expected energy required to travel from the current position to the desired destination.

In some embodiments, EV total travel time for each potential route includes consideration of roadway conditions, traffic congestion, weather conditions and/or emergency traffic considerations.

In some embodiments of the present invention, the EV route guidance information further includes consideration of actual or probable requests for route guidance including battery charging-replacement station usage from other EV's traveling within a defined radius distance from said EV position.

The present invention also includes application of the above EV battery energy management and route navigation control to autonomous or driver-less vehicles with no required driver input for route decision-making.

Other embodiments of the present invention involve the use of fuzzy logic calculations for battery energy management and navigation route control as described above. Such fuzzy logic calculations comprise defined of fuzzy sets with possible overlapping parameter ranges with decisions based on calculation of degrees of membership in defined fuzzy sets for particular considered route evaluation parameters. Defuzzification of multiple fuzzy logic degrees of memberships results in crisp numerical route selection indices for particular routes considered. A particular route may be selected based on comparison to these derived crisp numerical route selection indices.

These and other features of the present inventions are described in more detail below.

BRIEF DESCRIPTION OF THE DRAWINGS

While the present invention is amenable to various modifications and alternative forms, specific embodiments thereof are shown by way of example in the drawings and will herein be described in detail. The inventions of this disclosure are better understood in conjunction with these drawings and detailed description of the preferred embodiments. The various hardware and software elements used to carry out the inventions are illustrated in these drawings in the form of figures, block diagrams, flowcharts and descriptive tables setting forth aspects of the operations of the invention.

It should be understood, however, that the drawings and detailed descriptions are not intended to limit the invention to the particular form disclosed, but on the contrary, the intention is to cover all modifications, equivalents and alternatives falling within the spirit and scope of the present inventions as defined by the appended claims.

FIG. 6 illustrates, without limitation, exemplary cloud or remote computing database information accessible to the electronic vehicle control units to optimize operations of the systems and methods of the present inventions.

DETAILED DESCRIPTION

Figure 1:
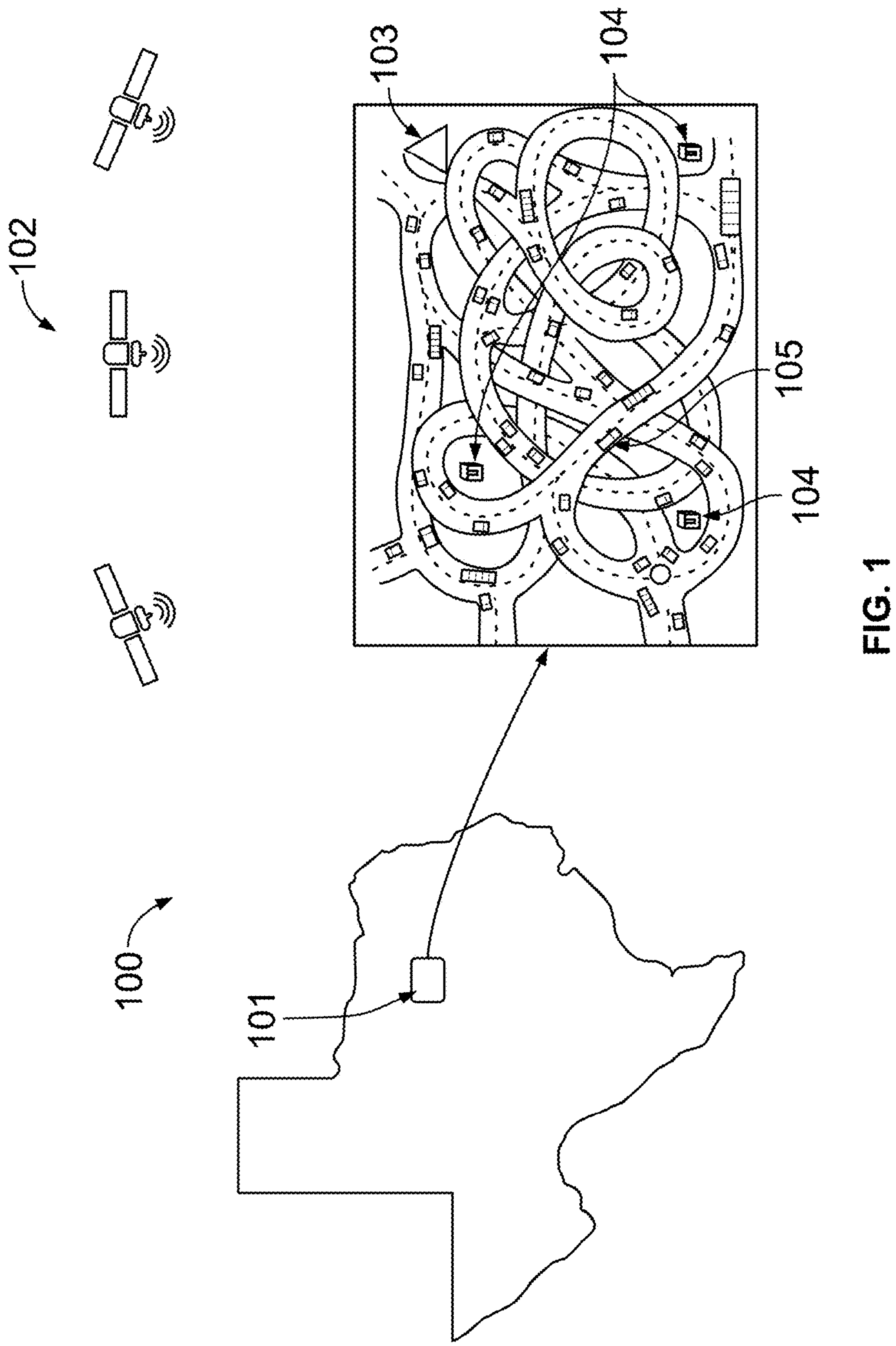
FIG. 1 illustrates, without limitation, an exemplary configuration of a driving situation with recharging stations benefiting from the routing and control system and methods of the present inventions.

FIG. 1 illustrates, without limitation, an exemplary configuration (100) of a driving situation with recharging stations benefiting from the routing and control systems and methods of the present inventions. An exemplary driving area (101) is depicted illustrating area roadways with automotive traffic and charging stations (104). Automobiles may receive geographic coordinate information, for example, from GPS satellites (102). As illustrated in the figure, communication with GPS satellites permits triangulation calculations to determine the GPS coordinates of individual automotive vehicles. In other embodiments of the invention, such location information may also be derived from other sources including, for example, cellular telephone towers or other signal transmission means permitting calculation of location coordinates. A particular automotive vehicle (105) is illustrated. In this particular example, the automotive vehicle (105) is traveling to the destination (103), also illustrated in FIG. 1. The charging stations (104) may be used to replenish battery energy in the automotive vehicles traveling on the roadways of the area (101). In some embodiments of this invention, the charging stations may also provide replacement batteries for traveling vehicles. Such replacement stations may or may not include the electric recharging of the vehicle battery. In addition to the charging stations, certain of the roadways may include wireless or inductive power transfer as described above to provide charging vehicles parked at such stations. Wireless or inductive power transfer may also include roadway implemented energy transfer capability for inductive power transfer to moving vehicles as described above and in the cited references.

Figure 2:
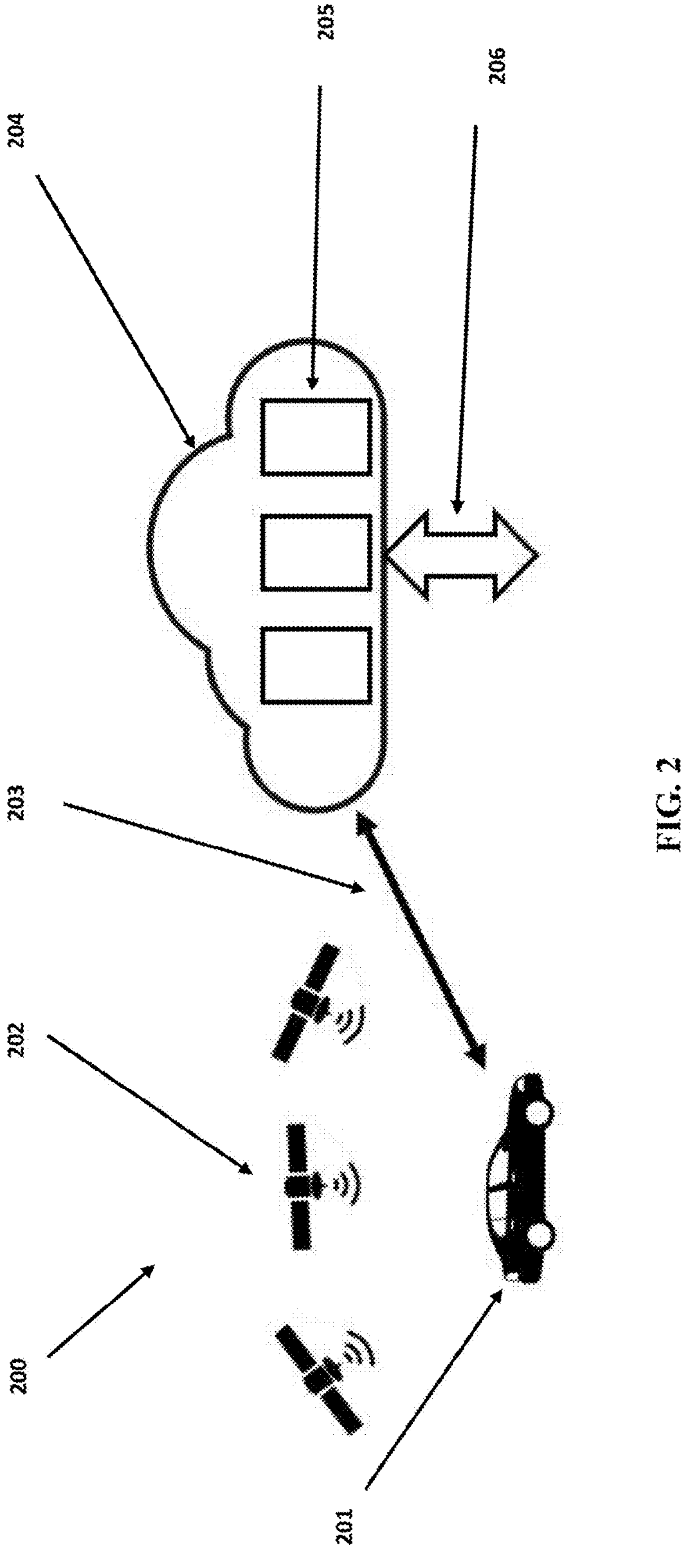
FIG. 2 illustrates, without limitation, exemplary communications between satellite GPS transceivers and cloud-based control or remote computer data processing equipment useful in the systems and methods of the present inventions.

FIG. 2 illustrates, without limitation, an exemplary configuration of a system (200) benefiting from the routing and control system and methods of the present inventions. The vehicle (201) communicates with GPS satellites (202) for determination of geographic coordinates of the vehicle (201) as described above. The vehicle (201) also communicates with cloud-based or remote computation and control capabilities via radio link (203). The radio link (203) may be implemented with various RF radio signal technologies including, for example, cellular telephone links, Wi-Fi links, Bluetooth links, or any other appropriate radio signal implementation depending on the location of the vehicle and/or design choices for the systems and methods of this invention. The cloud-based or remote computation and control capability as illustrated graphically at (204) may include appropriate computer and/or database information (205) described more completely below and useful in the implementation of the systems and methods of the present inventions. Such cloud-based or remote communication control capability may further communicate with additional information resources and/or other computational and control facilities useful in the present inventions by additional communication links (206).

Figure 3:
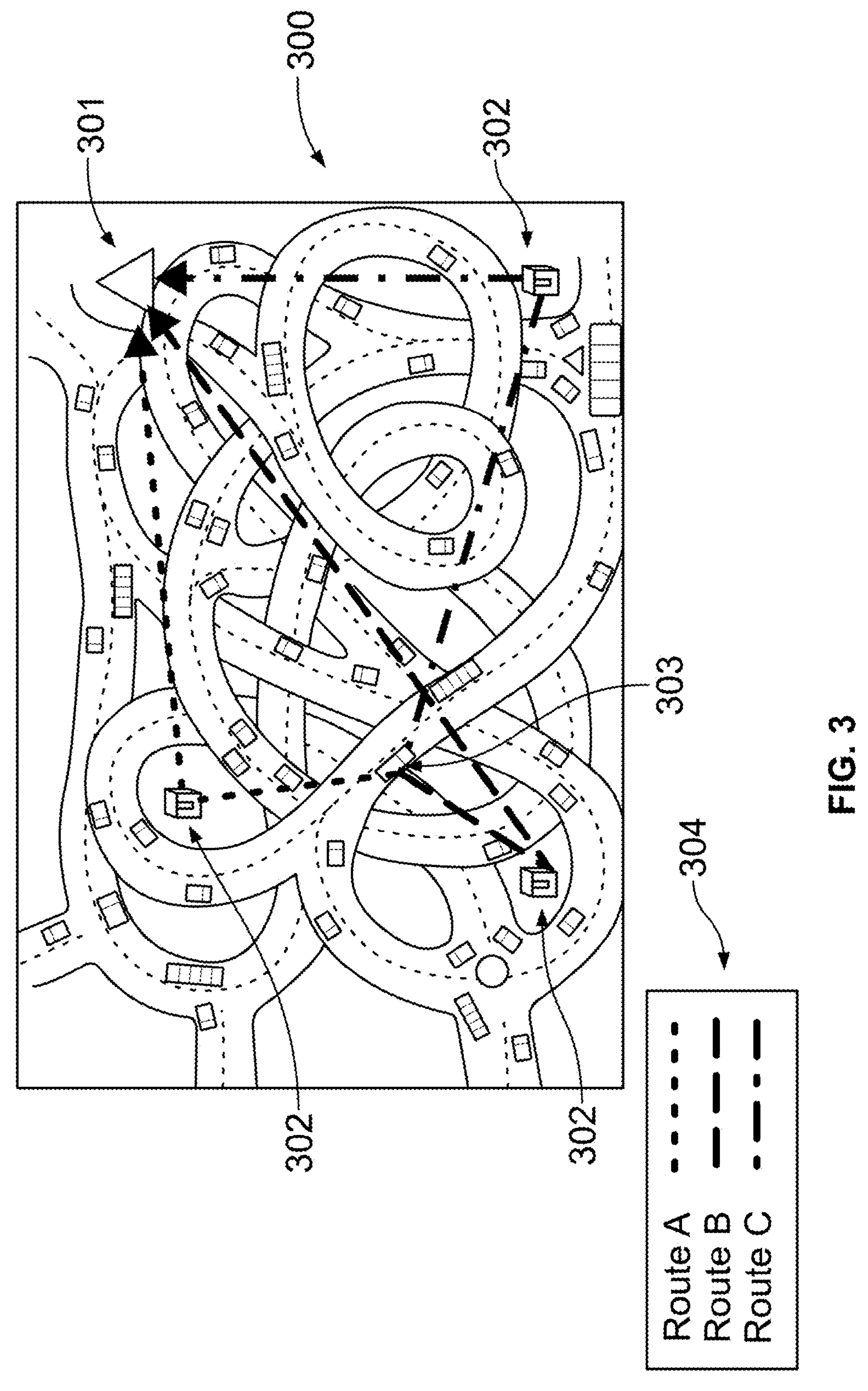
FIG. 3 illustrates, without limitation, an exemplary travel map depicting possible alternate routes with charging stations between a vehicle's current location and its destination location.

FIG. 3 illustrates, without limitation, an exemplary travel map (300) depicting possible alternate routes (304) with charging stations (302) between a vehicle (303) current location and its destination location (301). Three alternate routes A, B and C between the present position of vehicle (303) and the destination (301) are illustrated graphically in FIG. 3. In this example, it has been determined that the vehicle (303) has insufficient battery energy supply to reach the destination (301) without battery recharging or replacement. The three charging stations (302) along the routes A, B and C (304) represent possible recharging locations within the calculated reach of the vehicle (303) based on that vehicle's current energy supply and location. Choosing a particular route of travel and charging station involves many considerations. The overall time of travel for the vehicle (303) along possible alternate routes may be a factor depending upon the criticality of reaching the destination (301) at particular times. Of course that time of travel will depend upon the distance to be traveled along a particular route, traffic and roadway conditions along that route, required charging time at the selected charging station, congestion at charging stations with other vehicles requiring battery charging or replacement, driving habits of the driver of the vehicle (303) and possibly other complications in traveling along the selected route. Other considerations include the energy required for the automotive vehicle (303) electric battery in traveling along a particular selected route. For example, that energy will depend upon the required travel time, the selected roadway, including changes in elevation, number of starts and stops required, and the driving habits of the vehicle (303) driver. All of these factors and possibly others may be considered in selection of the best route among the alternatives A, B and C (304) depicted in FIG. 3. An object of the present invention is to provide an artificial intelligence expert system solution to this problem as described below. Some embodiments of the invention also include the use of fuzzy logic in selecting between the alternate routes A, B and C (304) for reaching the destination (301) as illustrated in FIG. 3.

Figure 4:
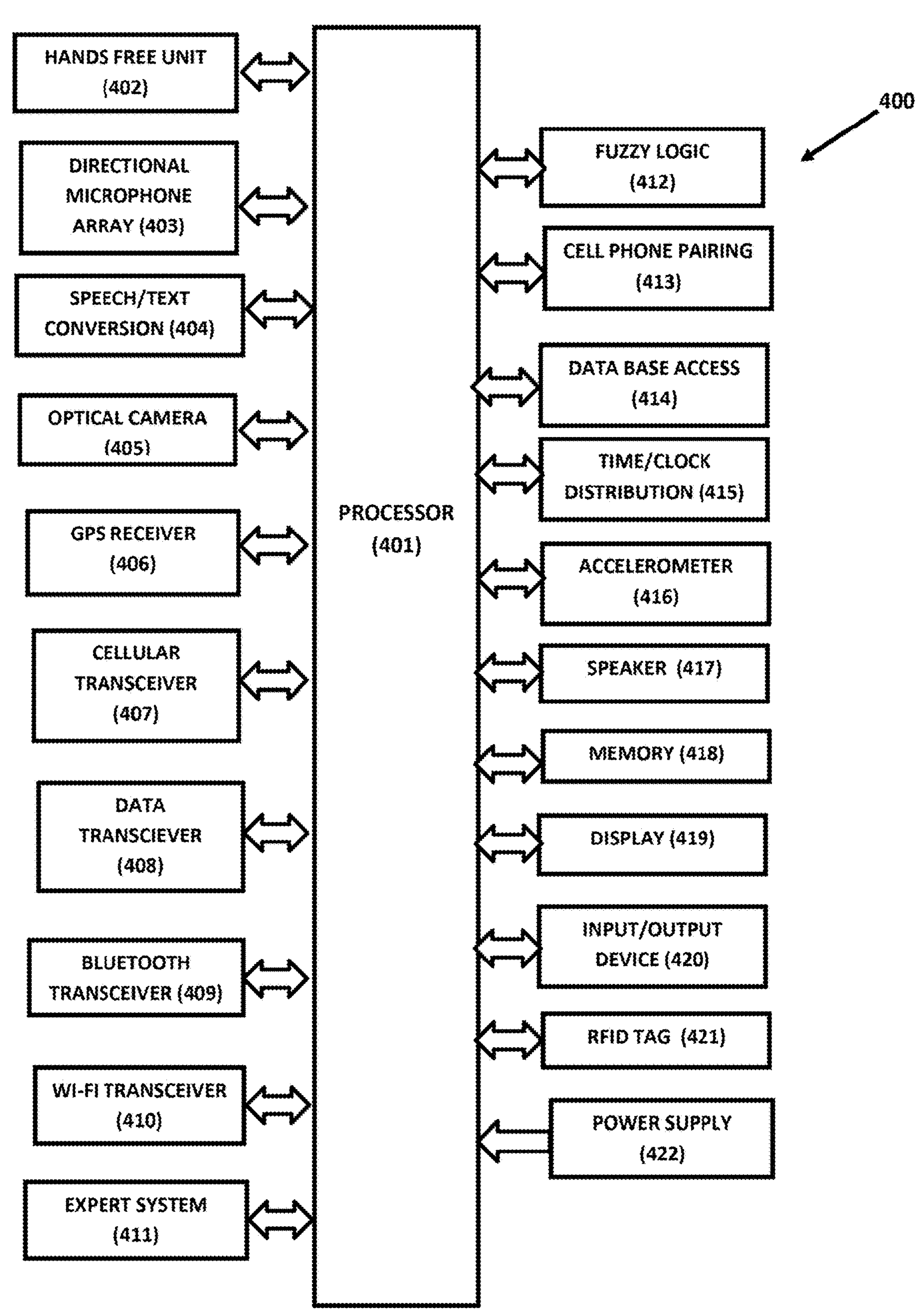
FIG. 4 illustrates, without limitation, an electric vehicle exemplary control unit with sensor inputs, communication capabilities, database information and processing useful in the systems and methods of the present inventions.

FIG. 4 depicts, without limitation, a block diagram of possible elements of an exemplary electric vehicle (EV) control unit (400) useful in the systems and methods of the present inventions. The EV control unit (400) of FIG. 4 depicts a comprehensive collection of possible capabilities. It is to be understood that the EV control unit (400) of FIG. 4 and as described elsewhere in this specification or in different embodiments of this invention may include all or a selected subset of the total capability of the EV control unit (400) of FIG. 4.

The processor (401) may be of any suitable configuration known to those of skill in the art. For example, the processor (401) may be a computer, microprocessor, a DSP (digital signal processor), or other control circuitry suitable for this application. In addition the processor (401) may be configured using a combination of these technologies.

As shown in FIG. 4, the EV control unit may include multiple interconnected capabilities that may be attached to or designed as an integral part of the hardware or software of the processor (401). These various capabilities useful in the operation of the EV control unit of this invention are characterized and discussed more completely below.

As indicated in FIG. 4, the EV control unit (400) may include hands-free unit (402) permitting operation of a telecommunications device or cellular telephone in a hands-free mode. Such units may connect to a telecommunications device or cellular telephone using, for example conventional Bluetooth or Bluetooth Low Energy (BLE) (409), Wi-Fi (410) or other radio frequency data transceiver (408) communication links. The hands-free unit (402) permits answering, placing and carrying on voice or text communications via an external cellular telephone network using voice commands only without requiring the driver to hand-manipulate or operate telecommunications or cellular telephone equipment while driving. Such hands-free communications may be important in the reduction of cognitive distractions to a driver of an EV vehicle in need of battery charging or replacement.

As also indicated in FIG. 4, the EV control unit (400) may include one or more directional, beamforming microphone arrays (403). Such directional, beamforming microphone arrays are useful in isolating and capturing audio voice signals from individual speakers in the presence of interfering signals from other speakers and other environmental noise signals. For example, environmental noise signals may include audio signals generated from other sources including other passengers, radio, automotive engine and vehicle operation and external noises such as generated by traffic or wind outside of the vehicle or other road noises. Directional beamforming microphone arrays are particularly useful in isolating speech signals of a desired speaker to the exclusion of other noise signals in the environment of the speaker.

As also shown in FIG. 4, the EV control unit (400) may include a speech-to-text conversion capability (404). In some embodiments of this invention the speech-to-text conversion capability (404) may be used to convert speech signals received from the directional microphone arrays (403) to text form, as well as for conversion of speech signals received by the EV control unit (400) from the telecommunication device or cellular telephone being used by the vehicle driver for texting. Also, in some embodiments, the speech/text conversion capability (404) may be used to convert text information or messages to speech enabling communicating with the driver of the motor vehicle or others in the motor vehicle in an audible, recognizable speech format. This capability may be important in some embodiments for system control and providing audible instructions or warnings to the driver and/or other occupants of the motor vehicle.

As also shown in FIG. 4, the EV control unit (400) may include an optical camera (405) for capturing images of the driving environment encountered by the driver of the EV. Optical camera (405) may be capable of taking multiple individual photos or videos. Such images will be useful in some embodiments this invention to evaluate particular driving conditions such as traffic congestion, accidents, roadway obstructions or other conditions that may affect the ability or time required for the EV to reach a designated charging station and ultimately to reach the desired destination.

The optical cameras (405) of FIG. 4 may also be used with image analysis software to perform such tasks as facial recognition to identify particular drivers. The EV control unit may be used to maintain history files of motor vehicle drivers with histories of their driving habits including driving tendencies that affect the efficiency of use of available battery energy. Examples of such tendencies that may be of concern include unnecessary frequent acceleration or braking. Particular drivers may present increased frequency of such inefficient driving habits. Facial recognition systems and methods of the present invention may include giving warnings or advice to particular drivers in an attempt to minimize inefficient driving habits. Such inefficient driving habits may also be reported to data collection centers for analysis and information. Such information may also influence the choice of the most appropriate route from multiple possible routes as illustrated in FIG. 3 and discussed above. Inefficient driving habits of particular drivers may be important considerations for some routes such as those with heavy traffic congestion, changes in altitude along a route, adverse driving weather conditions, or other such considerations.

As further indicated in FIG. 4, the EV control unit (400) may include a GPS (Global Positioning System) receiver (406) useful for tracking the location and movements of the motor vehicle. The Global Position System (GPS) may make use of triangulation calculations of positions based on signals received, for example, from multiple geostationary satellites. Such systems provide location information accurate within approximately one meter. Massive databases exist providing GPS coordinates for virtually every addressable location in the United States and elsewhere. Mobile communication networks implement Home Location Registries (HLRs) and Visitor Location Registries (VLRs) providing instant location information for mobile wireless devices throughout the country. Such databases also provide detailed maps of highways and roadways used by motor vehicles. Route maps and location information may be used in the present invention to verify that the motor vehicle is indeed traveling on established highways or roadways and further to provide markings of the location of such a vehicle as a function of time along those known routes. This information can be used in combination with accurate time/clock information available to the EV control unit (400) of this invention using, for example, time/clock distribution unit (415) shown in FIG. 4. Knowing the accurate time and location of a particular EV may be of assistance in determining the progress of that EV toward a battery charging or replenishing station or the final destination of the EV as depicted in FIG. 3.

EV location information may also be derived based on the EV distance from cellular telephone towers or other known fixed locations transmitting signals that may be received by one or more of the receivers of the EV control unit (400) of FIG. 4. Here again, triangulation calculations may be made using three or more such location transmission signals.

As also shown in FIG. 4, the EV control unit (400) may include a cellular transceiver (407) used to receive and transmit cellular communication information between the EV control unit (400) and external sources accessible to the cellular telephone network or a telecommunication device or cellular phone located in the motor vehicle. The cellular transceiver (407) may be used, for example, to communicate with cloud-based computation, database management and control systems of the type illustrated in FIG. 2 above and discussed more completely below.

In addition, as shown in FIG. 4, the EV control unit (400) may further include a data transceiver (408) useful for communications with other devices in the motor vehicle including vehicle information systems, control and display systems, as well as telecommunication devices or cellular telephones or Internet/World Wide Web (WWW) connections.

Similarly, as shown in FIG. 4, the EV control unit (400) may also include a Bluetooth transceiver (409) and/or a Wi-Fi transceiver (410). Both Bluetooth and Wi-Fi transceivers are used for short-range voice and data communications. In the present invention such transceivers may be used to communicate between EV control unit (400) and charging stations that are being or may be used by the EV. Such Bluetooth and Wi-Fi transceivers may also be used, for example, to communicate with nearby vehicles present in ongoing traffic or waiting for use of particular charging stations such as the type illustrated in FIG. 3 above.

Telecommunication transceivers, such as a cellular transceiver (407), the data transceiver (408), Bluetooth transceiver (409) and/or the Wi-Fi transceiver (410) may also be used to communicate with near field communication devices, including toll tags stations, charging stations, or other stations encounter by the EV where the transfer of information between the EV and the station may be used to improve efficiency of driving and battery usage and also to improve navigation route selection depending upon particular circumstances and conditions encountered by the EV.

In some embodiments, the EV control unit (400) of FIG. 4 may include artificial intelligence expert system technology (411) with the goal of improving decisions made by the EV control unit (400). Such artificial intelligence expert system technology may prove especially beneficial in assessing the most appropriate route selection and navigation guidance for the EV. In some embodiments of the present invention, expert system technology may be used to program decision making capability based on inputs from experts with particular EV technology knowledge, battery efficiencies and range considerations, and the impact of multiple factors such as roadway conditions, weather conditions, traffic conditions, accidents or dangerous situations, and/or other motorists parameters that may affect decisions and selection of the best route of travel for the EV to reach appropriate battery charging or replenishment stations and the ultimate destination of the EV. Inputs from such experts may be used to program the expert system formulations of the present invention. In addition, such expert system information may be dynamically changed depend upon changing environments such as driver habits or other important EV situational considerations. As described further below, in some embodiments, such expert system knowledge is conveniently set forth in propositional calculus statements with appropriate multiple parameter matrix presentation.

The artificial intelligence expert system capability (411) may also include "learning" capability, including the development of databases recording driving habits of particular drivers, such as driving acumen and driving tendencies that may result in more or less efficient use of onboard battery energy in the EV. Such "learning" will result in an adaptive control system providing feedback to the EV driver and/or control systems for continuous optimization of route selection in the presence of dynamically changing EV situations.

As also indicated in FIG. 4, the EV control unit (400) may include fuzzy logic capability (412). Fuzzy logic is a method of representing analog processes on a digital computer. With fuzzy logic control, statements are written in the form of the propositional calculus logic statements. These statements represent somewhat imprecise ideas reflecting the states of the variables. Fuzzy logic is particularly appropriate when an expert is available to specify these propositional statements characterizing the relationships between system variables. In the present invention such propositional statements and fuzzy logic may be beneficial in analyzing the relationships between various parameters characterizing driving situations and responses to those situations as described more completely below.

Telecommunication device or cell phone "pairing" (413) may also be included in the EV control unit (400) of the present invention. Such "pairing" permits a telecommunication device or cell phone to be connected to EV control unit (400) via telecommunication links such as Bluetooth, Wi-Fi or the like. With these connections, voice or data communication signals transmitted to and from the telecommunications device or cellular telephone may be relayed through the EV control unit (400) via the interconnecting telecommunication links. In addition, such "pairing" permits commands and responses to be communicated between a telecommunications device or cellular telephone and the EV control unit (400). One intended use of such commands would be to better inform the driver of the EV of appropriate actions to be taken to ensure adequate battery energy is available to reach the desired destination of the EV.

In addition, as shown in FIG. 4, the EV control unit (400) may further include a data-base access capability (414) connected to EV processor (401) for accessing and updating data-base information useful in the operation of the present invention. The data-base information may be stored locally as part of the EV control unit (400), or maybe located remotely and accessible, for example, from the cloud or other remote processing systems through the Internet, cellular telephone communication networks or other appropriate radio links. In some instances, database information may also be accessed from information stored in other control and information data files implemented in the motor vehicle such as information stored for use by vehicle information display systems. Such vehicle information display systems may include information necessary for dashboard displays concerning vehicle operational status, speed, odometer readings, engine performance, battery charge levels and warning signals. In addition, other control and information data files implemented in the motor vehicle may include files used to drive other on-board displays including, for example, touch screen displays or displays manipulated using point-and-click or other operator controls for navigating and selecting information to be displayed including, for example, navigation information and maps, vehicle status, weather, entertainment system control, telecommunication device control and the like. In some embodiments of this invention, information from EV control unit (400) may in fact be displayed on such other on-board displays or may be made available for access by the motor vehicle driver or passengers using such displays. In some embodiments of this invention the EV control unit (400) may be integrated into and made an operational part of other vehicle control and/or display systems including, for example, the EV's telematics unit.

In addition, as shown in FIG. 4, the EV control unit (400) may further include a time/clock distribution capability (415) operating to make accurate date and time information available to the EV control unit (400). Such information may be used, for example, in the calculation of vehicle speed by providing elapsed time between particular vehicle location points along a route of travel. Such time and date information may also be used to create history files recording, for example, battery charging levels, inefficient driver operation of the EV with timestamps, date and time of requests for assistance or routing information, date and time of particular drivers being in control of the EV and other such information useful in the embodiments this invention. In some embodiments such information may be reported to vehicle owners or operators such as taxicab companies, trucking companies, rental car agencies or other equipment leasing or renting organizations employing or otherwise using drivers to operate their vehicles or equipment. Such reported information may be used, for example, to work with drivers to improve their driving habits, admonish drivers for inefficient driving habits or to take other corrective action deemed necessary for operational cost, safety or liability concerns.

In addition, as shown in FIG. 4, the EV control unit (400) may further include accelerometer (416) capabilities. An accelerometer is a device that can measure the force of acceleration, whether caused by gravity or by movement. An accelerometer can therefore be used to measure or assist in the measurement of the speed of movement of an object to which it is attached. In the present invention, accelerometers may be used to monitor frequent and/or unnecessary vehicle acceleration which require increased energy utilization from the EV battery sources. For example solid-state accelerometers can sense the tilt, movement and speed being applied to them. Useful accelerometer technology includes piezoelectric, piezoresistive, resonant, strain gauge, capacitance, tunneling, and heated liquid and gas accelerometers. Silicon MEMS accelerometers that work on the capacitive approach or ones that that are based on temperature differentials in heated-gas are useful in some embodiments of this invention. Such thermal accelerometers may be fabricated in monolithic structures with integration with all the necessary signal conditioning, interface and embedded circuitry on a single integrated circuit. Accelerometers are used today in automobiles for crash detection and airbag deployment and detection of automobile rollover accidents.

A speaker unit (417) may also be included as part of the EV control unit (400). The speaker may be used to announce battery charging levels, remaining distance with the present battery charging, advice on selected routes, including routes that may include charging stations, projected time to the destination, and other such calculations made by the systems and methods of the present invention. The speaker may also be used to instruct the driver of particular actions to be taken to ensure sufficient battery charging and attainment of the desired destination in minimal time.

In addition, as shown in FIG. 4, the EV control unit (400) may further include associated memory (418) for storing software programs, vehicle information, measurement history information and other data useful or collected by the EV control unit (400) in the operations of this invention. The associated memory (418) may comprise random access memory (RAM), read only memory (ROM), solid-state memory, disk memory, optical memories or any other appropriate memory technology known to those of skill in the art. While memory unit (418) is shown in FIG. 4 is a separate assembly, it is to be understood that some or all of such memory may be distributed among other various operational, control and communication capabilities of the EV.

In addition, as shown in FIG. 4, the EV control unit (400) may further include display capability (419) for displaying operational status and information concerning the operation and calculated results derived by the EV control unit (400). The display (320) may be a separate display associated with EV control unit (400), or, alternatively, the display (419) may be integrated with an operational part of other displays present in the motor vehicle such as a motor vehicle telematics unit. Useful display technologies include liquid crystal displays (LCD), light emitting diode displays (LED), plasma displays, smart glass, touch screen displays, menu-driven displays, and displays operated using speech commands or other suitable display technology.

In addition, as shown in FIG. 4, the EV control unit (400) may further include additional input-output-device (420) capabilities. For example, standard USB ports may be used for such access. Other possibilities include the Common Flash memory Interface (CFI) approved by JEDEC and other standard memory unit interfaces. Other possibilities include audio input/output ports, video ports such as HDMI ports and other input/output capabilities.

As also shown in FIG. 4, the EV control unit (400) may further include an RFID (radio frequency identification) tag device (421) used to identify the motor vehicle and communicate information or results from EV control unit (400) to RFID tag readers located along highways tollways or roadways along which the motor vehicle is traveling. The RFID tag device (421) operating with EV control unit (400) may be powered by power supply (422) of the EV control unit (400) shown in FIG. 4. Alternatively the RFID tag device (421) may be powered from externally generated electromagnetic energy waves emitted by an RFID tag reader. Information transmitted from the RFID tag device (421) may include information indicating battery charging level and another vehicle status information.

In addition, as shown in FIG. 4, the EV control unit (400) may further include a power supply (422) necessary for operation of the EV control unit (400) including the various capabilities depicted in FIG. 4. The power supply (422) may derive energy from the vehicle electrical power supply source or may be implemented as a separate battery or energy supply including, without limitation, solar energy, energy derived from external impinging electromagnetic waves, or energy derived from motor vehicle mechanical operations such as breaking or coasting.

It is to be understood that while the EV control unit (400) of FIG. 4 is depicted and described above as a unitary assembly, it is also possible, and in some cases desirable, that perhaps some of the operational features shown in FIG. 4 are shared and possibly implemented as part of other automobile control, communications, processing and/or display capabilities such as a motor vehicle telematics unit. In addition, it should be clear that several of the operational capabilities of the EV control unit (400) of FIG. 4 may be implemented with distributed devices and/or capabilities located throughout the motor vehicle and communicating with the processor (401) as indicated in FIG. 4.

It should further be understood that other embodiments of the systems and methods of this invention may use a subset of the capabilities depicted in FIG. 4 without departing from the fundamental integrated system and method teachings of this invention.

Figure 5:
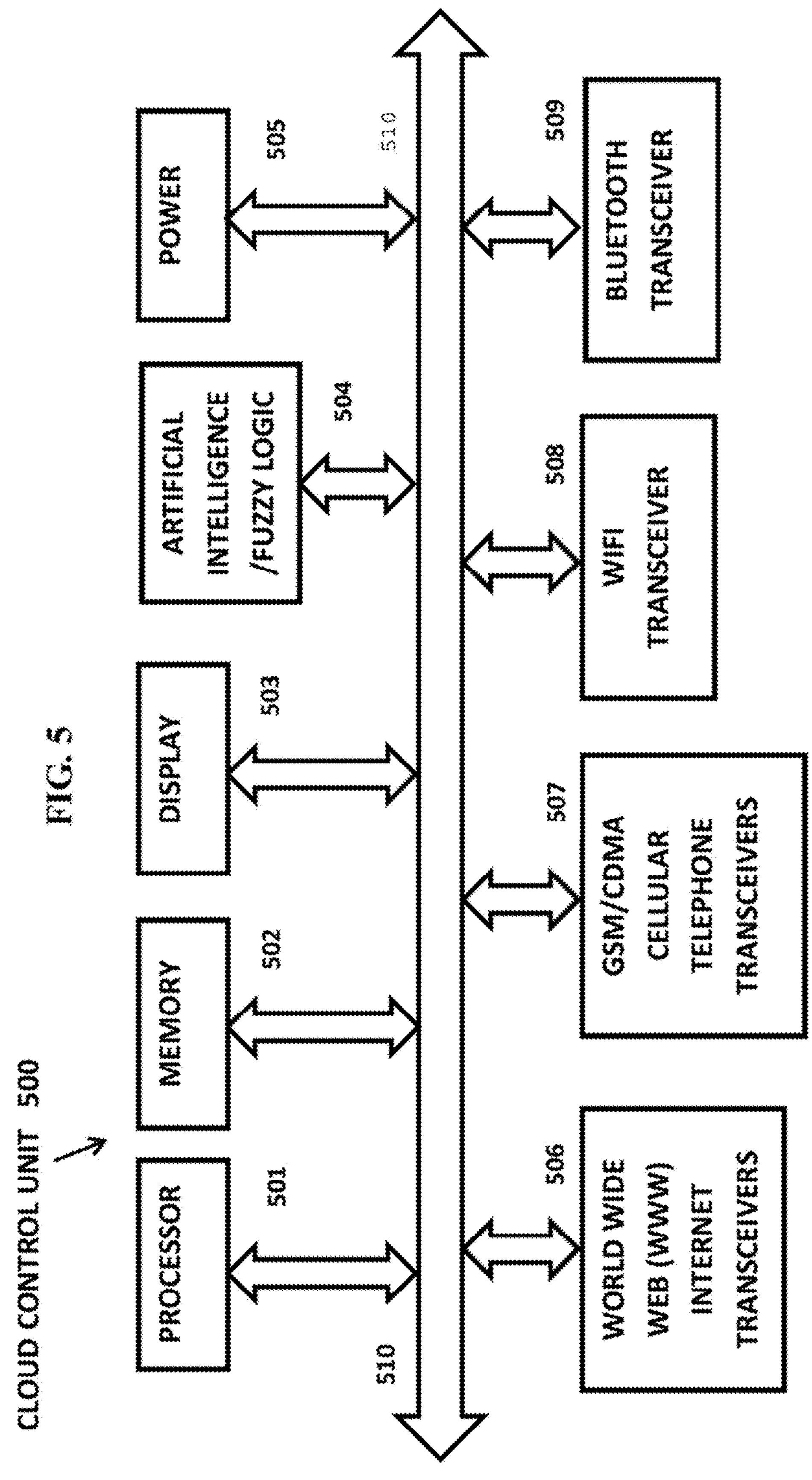
FIG. 5 illustrates, without limitation, an exemplary cloud-based or remote computing and database control unit useful in the systems and methods of the present inventions.

FIG. 5 depicts, without limitation, a block diagram of possible elements of an exemplary electric vehicle (EV) cloud control unit (500) useful in the systems and methods of the present inventions. The EV cloud control unit (500) of FIG. 5 includes a comprehensive collection of possible capabilities. It is to be understood that the EV cloud control unit (500) of FIG. 5 and as described elsewhere in this specification or in different embodiments of this invention may include all or a selected subset of the total capability of the EV cloud control unit (500) of FIG. 5.

The processor (501) may be of any suitable configuration known to those of skill in the art. For example, the processor (501) may be a computer, microprocessor, a DSP (digital signal processor), or other control circuitry suitable for this application. In addition the processor (501) may be configured using a combination of these technologies, including the use of multiple processors.

In addition, as shown in FIG. 5, the EV cloud control unit (500) may further include associated memory (502) for storing software programs, vehicle information, EV history information and other data useful in the operations of this invention. The associated memory (502) may comprise random access memory (RAM), read only memory (ROM), solid-state memory, disk memory, optical memories or any other appropriate memory technology known to those of skill in the art. While memory unit (502) is shown in FIG. 5 as a separate assembly, it is to be understood that some or all of such memory may be distributed among other various operational, control, communication and/or database information storage units.

In addition, as shown in FIG. 5, the cloud control unit (500) may further include display capability (503) for displaying operational status and information concerning the operation and calculated results derived by the cloud control unit (500). The display (503) may be a separate display associated with cloud control unit (500), or, alternatively, the display (503) may be integrated with an operational part of other displays. Useful display technologies include liquid crystal displays (LCD), light emitting diode displays (LED), plasma displays, smart glass, touch screen displays, menu-driven displays, and displays operated using speech commands or other suitable display technology.

As also shown in FIG. 5, the cloud control unit (500) may also include artificial intelligence expert system capability to complement or used in place of that described above for the EV control unit (400) of FIG. 4 and described more completely below. In some embodiments, the artificial expert system capability may also include fuzzy logic capability to further complement or be used in place of that described above for the EV control unit (400) of FIG. 4. For example, the artificial intelligence fuzzy logic capability (504) of FIG. 5 may include varying fuzzy logic implementations for multiple variable inputs and variations of such algorithms that may be useful in determining optimal routes for EVs accessing the cloud control unit (500). Using the communication capabilities of the cloud control unit (500), it is also possible to download expert system artificial intelligence and fuzzy logic algorithms as appropriate to EVs having access to the cloud control unit (500).

In addition, as shown in FIG. 5, the cloud control unit (500) may further include a power supply (505) necessary for operation of the cloud control unit (500) including the various capabilities depicted in FIG. 5. The power supply (505) may derive energy from a local power supply source or may be implemented as a separate battery or energy supply including, without limitation, solar energy, wind energy, or other green energy sources.

As also shown in FIG. 5, the cloud control unit (500) may also comprise World Wide Web (WWW) Internet transceivers (506). Such transceivers ensure access to the cloud control unit (500) from EVs in need of route guidance for the purpose of recharging or replenishing battery energy as discussed above. The World Wide Web Internet transceiver interfaces may be accessible to all vehicles, or registration may be required to gain access to the routing database information available from the cloud control unit (500).

As shown in FIG. 5, the EV cloud control unit (500) may include a GSM/CDMA or other cellular transceiver (507) used to receive and transmit cellular communication information between the EV cloud control unit (500) and external sources accessible to the cellular telephone network or a telecommunication device or cellular phone located in an EV. The cellular transceiver (507) may be used, for example, to communicate with cloud-based computation, database management and control systems as discussed more completely below.

Similarly, as shown in FIG. 5, the cloud control unit (500) may also include one or more Wi-Fi transceivers (508) and/or Bluetooth transceivers (509). Both Bluetooth and Wi-Fi transceivers are used for short-range voice and data communications. In the present invention such transceivers may be used to communicate between cloud control unit (500) and nearby computation, storage or information access devices or units.

In addition to the communication capabilities shown in FIG. 5, other communication links not shown including, for example, cable links, fiber optic links, of other radio or wired connections may be used to communicate via element (510) with the cloud control unit 500 of FIG. 5.

FIG. 6 depicts, without limitation, database elements (600) of the cloud control unit (500) depicted in FIG. 5 and discussed above. The database elements (600) may be centrally located in a database storage unit or may be distributed among several such units or part of database information accessible from the cloud control unit (500) of FIG. 5, or from EVs requiring access to such information. In the case of distributed database information, information indicated in FIG. 6 may be part of database information from distributed agencies or organizations such as weather database information, police report information, highway or road management agencies, traffic monitoring agencies, or agencies responsible for EV charger stations.

The cloud control unit EV database management unit (601) is accessible by communication links (610) as indicated in FIG. 6. Unit (601) responds to requests for information from the database files indicated in FIG. 6. Such information may be used, for example, to determine optimal routing for EVs in need of battery charging or replenishment as described above and in more detail below.

For example, the database information (600) of FIG. 6 includes navigation system data (602). Such information includes data descriptive of travel routes, including location addresses along those routes and the location of the EV battery charging stations. This information exists today in the form of navigation system databases used by multiple services available on the Internet to provide routes between destinations using GPS coordinates and/or specific address information describing the coordinates of current locations and destination locations. The same databases used for those purposes may be used in embodiments of the present invention or separate databases devoted to optimal routing for EVs to manage a battery charging energy considerations may be used.

As also indicated in FIG. 6, database information (600) may include navigation route information for roadways or routes especially recommended for driverless or autonomous vehicles. Such roadways or routes may include special driverless or autonomous vehicle control features such as roadway markings, signs, electronic signals, night lighting features or similar such marking or control capabilities to assist in the operation of driverless or autonomous vehicles.

In addition, the cloud control unit EV database management (600) of FIG. 6 may also include traffic database (603). Such traffic database information may include information descriptive of vehicle congestion, pedestrian traffic and/or the density or number of EVs present in a specific area. The number of EVs present may be used to alter routing decisions based on the likelihood that multiple such EVs will be in need of battery charging or replenishment. In this case, it may be desirable to route EVs requesting charger station locations in a manner that avoids directing multiple EVs to the same chargers, even though those chargers may be in close proximity to multiple such EVs.

The database information of FIG. 6 may also include EV account data (604). Such account data may be obtained by registering potential users of the invention with uploading of the information from user communication devices, computers, the EV manufacturer, government EV records or from the EV itself. Such account information may include important vehicle data, including the vehicle type, the vehicle energy usage, required vehicle charging times and other important vehicle information useful in determining optimal routes of travel for EVs in need of battery charging or replenishment. EV account data may include static data descriptive of the vehicle itself as well as data that may dynamically change with time, such as the vehicle weight, vehicle condition, identification of vehicle driver or vehicle history files recording, for example, energy usage or performance history.

As also indicated in FIG. 6, the cloud control unit EV database management (600) may include battery charger-replacement station data (605). As discussed above, multiple charger implementations are available including single-phase AC, three-phase AC and DC chargers of varying power capacities and requiring different charging times. It is important in advising EVs with specific charging requirements that those EVs are directed to the appropriate charger type and a charger capable of delivering the required charge while meeting desired charger times. Charging times may be influenced by charger station status which may be temporarily out of service, or undergoing routine maintenance, or, for other reasons, not immediately available to provide charging capabilities. In addition, charger queues may develop with multiple EVs waiting for access to a given charger. In the case of battery replacement, the station database information (605) will include replacement battery availability, types and battery interchangeability information. All these factors need may be considered when recommending travel routes to particular charging-replacement stations for requesting EVs.

As also indicated in FIG. 6, the cloud control unit electric vehicle, database management (600) may include weather information (606), including present weather conditions, weather forecasts and/or particular information concerning inclement weather involving for example, ice, snow, rain or flooding. In some cases, particular roadways may be more affected by inclement weather than others. For example, roadways with multiple bridges or highway interchange overpasses may be more affected by ice and snow than roadways without such structures. Roadways passing through lower areas susceptible to high waters or flooding should be avoided when selecting routes for EVs in need of battery charging or a replacement. Also, forecasted inclement weather may influence route selection for vehicles in need of battery charging or replacement.

Also, the database information available from the cloud control unit EV database management (600) may include police or law enforcement information (607) providing the locations of accidents or other emergencies, including criminal activity. Here again, such information may be considered when recommending routes for EVs in need of battery charging or replenishment. Delays caused by congestion or slow traffic resulting from such emergency situations may be intolerable to an EV with limited battery power range.

As further indicated in FIG. 6, recommending routes for EVs in need of battery charging or replenishment may be influenced by special events in progress or scheduled along selected routes. Special event data (608), including the locations of such events and predicted or real traffic or crowd congestion caused by such events may be considered. Here again, it may be the case that such event locations should be avoided when recommending routes for EVs in need of battery charging or replenishment.

Yet another consideration addressed in the database information indicated in FIG. 6 is that of road conditions (609). Road outages, road repairs or other dangerous roadway situations may be considered in the evaluation of alternate routes for recommendation to EVs in need of battery replacement or replenishment. Here again such situations should generally be avoided. The risk of battery charge depletion resulting from delays when encountering difficult road situations needs to be minimized.

Figure 7:
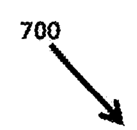
FIG. 7 illustrates, without limitation, an exemplary artificial intelligence expert system decision matrix for ranking the advisability of using particular routes with varying placement of charging stations, depending on the electric vehicle energy needs and time requirements to reach the destination using the systems and methods of the present inventions.

FIG. 7 depicts in matrix form artificial intelligence expert system relationships (700) between two selected parameters, energy needed and travel time that may be used in some embodiments of the present invention to assist in selecting a particular route for the electric vehicle to travel from its current position to its ultimate destination. As indicated in FIG. 7 the range of the parameters for energy needed and travel time are divided into exemplary subranges corresponding to very low, low, medium, high and very high. For each combination of such values for the two parameters being considered in FIG. 7, an artificial intelligence expert decision rating is provided indicating the desirability of traveling along a specific specified route having the corresponding values of the energy needed and travel time parameters. These route desirability ratings are provided by traffic management experts and are part of the artificial intelligence expert system database. As indicated in FIG. 7, the route desirable ratings may be defined by such experts as, for example, being very low, low, medium, high, and very high. In the exemplary embodiment depicted in FIG. 7, twenty-five such expert system defined rules are shown.

As stated above, the cloud control unit will derive numerical values for the energy needed and travel time parameters for each of the potential routes evaluated in response to the request from an individual electric vehicle. Each of those values will fall within one or more of the specified ranges as indicated as being very low, low, medium, high or very high. The 25 route desirability rating entries in the matrix of FIG. 7 represent the desirability of using a particular route for a given combination of the energy needed and travel time parameters.

While the example of FIG. 7 is limited to two variables, travel time and energy needed parameters, clearly additional tables may be constructed to include other important variables in the decision process. Multidimensional tables may be constructed with more than two variables to reflect additional indices. For example, a separation of travel time into two variables reflecting battery replenishment time and actual driving time may be used. Other parameters may include, for example, the condition of the vehicle, road conditions, driving impediments such as accidents or road construction, battery condition or other such variables that may affect the route selection process.

The route desirability rating matrix (700) of FIG. 7 is a form of artificial intelligence and forms the basis of an intelligent system. For example, each of the results indicated in FIG. 7 may be expressed in propositional calculus logic form, for example, as follows:

1. If energy needed is medium and the travel time is medium then route desirability rating entry is medium.
2. If energy needed is medium and travel time is high then the route desirability rating entry is low.
3. If energy needed is very low and travel time is medium then the route desirability rating entry is medium.

Clearly 25 such logical statements exist for the entries in FIG. 7. For each such logical statement, a route desirability rating for the given route may be determined by the expert system of the present invention. The route desirability rating may be displayed on the display (419) of FIG. 4 in various forms including text messages, flashing alerts of various colors for various route desirability rating entries, with audible messages from the speaker (417) of FIG. 4 or with a combination of such visual or audible alerts.

Consider, for example, the three possible routes A, B and C of FIG. 3 discussed above. Each of those potential routes may be derived using existing routing and navigation systems including in-car systems available on purchased vehicles, add on navigation systems such as TomTom and Garmin, and cell phone, tablet or other wireless device navigation applications (apps) such as Google Maps or Waze. The complete route may be composed of two portions: (1) a route from the EV current position to a charging station, and, (2) a route from the charging station to the destination. The problem remains, however, to select from among the three potential routes based on the EV battery charging or replenishing requirements. The expert system matrix of FIG. 7 can be used to assist in making that selection based on the required energy needed and time required for each route of travel. Using the expert defined matrix of FIG. 7, a route advisory index of very low, low, medium, high or very high may be derived. In some situations, one route will have an advisory index higher than others and will be selected. It may also happen that more than one route will have the same advisory index. For example, in FIG. 7 multiple combinations of energy needed and travel time parameters result in a route advisory index of "medium." In such a case, a prioritization of energy and time requirements may be used to select the most desirable route. If travel time is more critical, the route with the lowest travel time will be selected. If multiple energy needs apply to that selected travel time, the route with the lowest energy level corresponding to the selected lowest travel time and will be selected. Additional parameter values may be considered if necessary as explained further below.

Figure 8A:
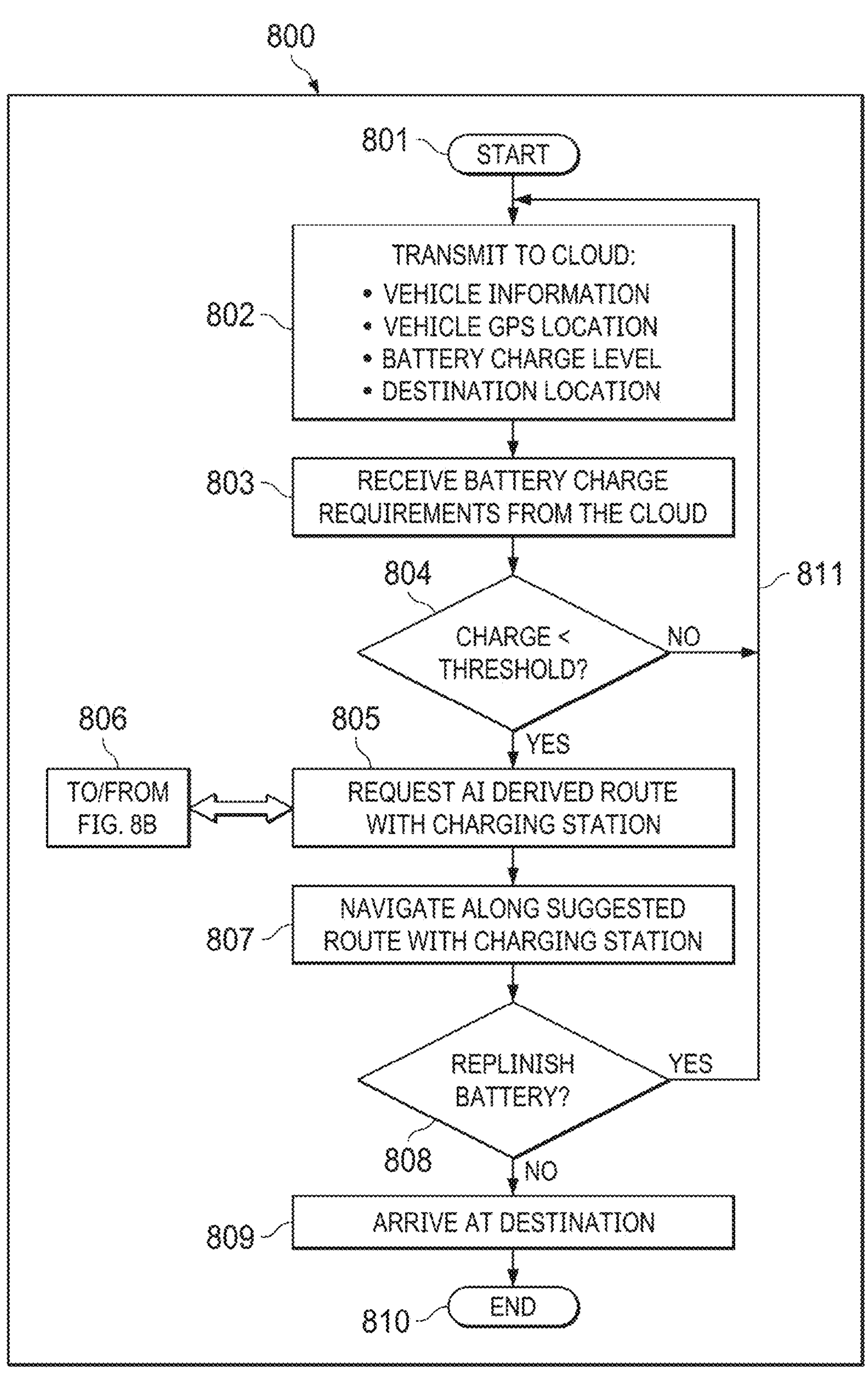
FIGS. 8A and 8B illustrate, without limitation, an exemplary artificial intelligence expert system flow chart depicting processing operations for the electric vehicle route determination systems and methods of the present inventions.
Figure 8B:
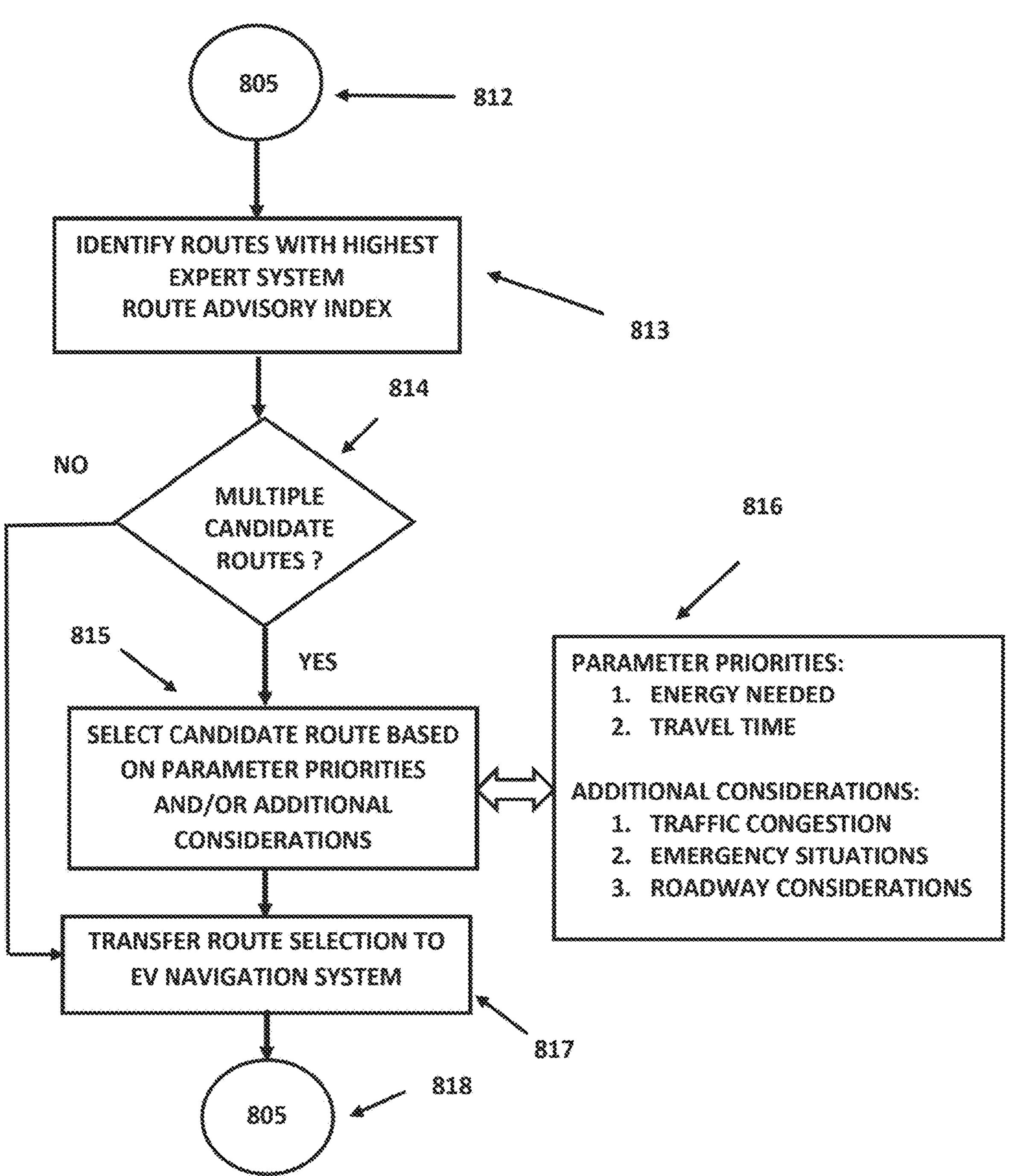

FIGS. 8A and 8B depict, without limitation, an exemplary flowchart (800) for the operation of the EV battery charging or replenishment systems and methods of the present invention. The process is initiated at start (801) which may be activated by the driver or automatically by the EV. When initiated, information (802) is transmitted to the cloud control unit, including, for example, information descriptive of the particular vehicle, the vehicle's location derived, for example, using GPS coordinates, battery charge level of the EV and the location or coordinates of the EV destination. Such parameters are used to properly evaluate the EV situation in terms of the sufficiency of battery energy available, the distance to the destination and the other considerations such as traffic congestion, roadway delays, inclement weather issues or other conditions or situations that may impact the sufficiency of battery energy to make the planned trip.

At (803) information indicating the battery charge requirements is received at the EV from the cloud control unit (500) of FIG. 5. The battery charge requirements will depend upon the various factors described above including vehicle and battery information, battery charge status, distance to the destination and roadway, possible routes of travel, traffic or other factors influencing the required energy to reach the destination as described above.

At (804), a decision is made as to whether or not it will be necessary to replenish the battery to a sufficient level necessary to travel to the final destination. Such a determination can be made, for example, by comparing the level of remaining battery charge energy to a threshold value based, for example, on the received battery charge requirements to reach the destination at (803). If the battery charged level is below the threshold, replenishment of energy will be needed. If no such replenishment is necessary, control is returned to start (801) for continuous or periodic updating of the vehicle information transmission to the cloud (802) for an evaluation of the battery charge requirements from the cloud at (803). If replenishment is required, control is passed to block (805) to request an artificial intelligence derived route, including a battery charging-replacement station appropriate to replenish the battery energy supply to a level sufficient to reach the final destination. In determining the suggested route, the invention of the present invention systems and methods may consider multiple possible routes with different locations of charging stations that may be in range of the present location of the EV requesting battery charging or replacement assistance as illustrated, for example, in FIG. 3.

Once a recommended route has been received, the EV will navigate along that route arriving at the selected battery charging-replacement station, replenishing the battery supply and then continuing on to the destination as indicated at block (807). While EV is navigating the selected route, the battery level is continuously monitored at (807) to determine whether or not that battery energy level has been depleted to the point where it may be necessary to replenish the battery again before arriving at the destination. In the case that additional replenishment or replacement is required, control is returned to start (801) with updating of the vehicle status information and with the above described steps being repeated to ensure sufficient EV energy is maintained. If it is determined at (807) that the battery does not need replenishing, the EV continues on to the destination as indicated at (808). The process ends at (809) when the destination is reached.

FIG. 8B depicts more detailed process flow evaluation of AI derived routes indicated at (805) and (806) of FIG. 8A. As indicated in FIG. 8B, control is passed from FIG. 8B (805) at (812). Multiple potential routes such as routes A, B, and C of FIG. 3 are evaluated and the routes with the highest expert system route advisory index set forth in FIG. 7 are selected. If one identified route has a higher route advisory index than any other identified route, then at (814) control is passed through (817) for transfer of the selected route to the EV navigation system. In this case control is returned by connector (818.)

It may also happen the multiple candidate routes may have the same advisory route index as indicated in FIG. 7. For example, more than one route may have an advisory route index of "medium." In this case control is passed from decision element (814) to (815) for further evaluation. For example, priorities may be established for individual parameters to further resolve selection of a desired route. As indicated in (816) parameter priorities may be assigned indicating that the energy needed parameter has a higher priority than the travel time parameter. In this case, routes having the same advisory route index in FIG. 7 would be compared based on energy needed. The route with the lowest energy requirement would be selected. In the event that multiple routes are still candidates, then the route with the lowest travel time would be selected from those having the same advisory route index and energy needed. In the event that candidate multiple routes multiple routes still exist, then additional considerations such as traffic congestion, emergency situations or roadway considerations may be taken into account to finally resolve the best route. In the event the multiple routes still exist that are basically equivalent, then one of those routes will be selected and passed to the EV navigation system as the recommended route to be traveled.

As explained above in FIGS. 7, 8A and 8B, routing options may be continually evaluated based on information provided from the electric vehicle to the cloud-based control unit used to select appropriate routes for electric vehicles under its control. As also explained above, the electric vehicle provides current location information for the vehicle and destination location information to the cloud-based control unit. Such location information may be in the form of GPS coordinates derived from satellite GPS systems as described above, or other suitable location information such as physical addresses of an electric vehicle, battery replenishment stations and changing destination information. The electric vehicle also supplies current battery charge levels to the cloud-based control unit. The electric vehicle also supplies information describing the electric vehicle's energy requirements, for example, in required kilowatt-hours per mile traveled. Clearly, such requirements will vary based on the type of vehicle such as a small electric vehicle to larger, heavier vehicles such as buses or trucks. Route guidance information may be derived from such dynamically changing information using present-day navigation systems known to those of skill in the art as discussed above.

Using the current vehicle location and destination location information, the cloud-based control unit may determine the travel time from the current location to the destination using present-day navigation systems known to those of skill in the art as discussed above. If it is determined that it is necessary to charge or replace the electric battery in the vehicle to have sufficient energy to reach the destination, the cloud control unit will evaluate multiple routes of travel that stop at different distributed charging stations in the current vicinity of the electric vehicle as described above. Clearly the distance traveled by the vehicle in reaching the destination may vary for each of the evaluated routes. Furthermore, the energy required to travel the various routes may vary depending upon the distance to be traveled and other factors such as variations in altitude along such routes, corresponding to hills or valleys to be traversed, traffic requirements along such routes that may result in travel delays or other impediments that may delay the electric vehicle such as accidents, crowds, road construction, etc. In addition to driving time, the total travel time may include time waiting in a queue at an individual charging or battery replacement station for others arriving ahead of an individual traveler to make use of the station. In addition, the total traveling time may include the actual time required to charge or replace the battery of the electric vehicle being considered. In some embodiments, it may be desirable to only provide replenishment energy to the electric vehicle battery sufficient to reach the destination or to reach the destination with possibly some additional energy margin to provide high confidence that sufficient battery energy has been supplied to reach the destination. The cloud control unit will derive numerical values for the energy needed and travel time parameters for each of the potential routes evaluated in response to the request from an individual electric vehicle.

In some embodiments, the EV route guidance information may further include consideration of actual or probable requests for route guidance including battery charging or replacement station usage from other EVs traveling within a defined radius or distance from said EV position. Such information may be gathered from said other EV's that may affect the expected waiting times or queues that may be encountered at battery charging or battery replacement stations on possible routes of travel. The consideration of such global battery charging or battery replacement requirements of vehicles in a given area results in a more optimal distribution of vehicles arriving at particular battery charging or replacement stations thereby relieving overall congestion at such stations.

An aspect of the present invention is that the artificial intelligence systems and methods of the present inventions make use of existing route guidance and navigation systems to derive potential routes of travel for further evaluation based on EV battery charging requirements. In this way, the systems and methods of the present inventions simplify required calculations for evaluation of potential routes wherein those potential routes have been derived taking in to account multiple route selection criteria including, for example, roadway conditions, traffic conditions and congestion, weather conditions, police reported concerns, and other concerns as discussed above. Possible routes can be derived using available navigation routing systems and methods. But those available and useful route determination and routing systems and methods do not include consideration of EV battery charging requirements and the availability of battery charging and/or battery replenishing stations along selected routes of travel. The present inventive systems and methods augment those existing navigation and routing systems and methods to further optimize route selection for dynamically changing EV battery charging and/or replenishment requirements.

The artificial intelligence presentation of selected routes also greatly simplifies the user interface to the route derivation for the EV battery charging or replenishing system and methods of the present invention. Importantly, the simplified presentation of the route desirability rating indices and/or final route selection minimizes cognitive distractions to the driver. Such cognitive distractions may increase danger to the driver in the vehicle. Minimizing such distractions is clearly important for safety reasons.

In the above-described embodiment of artificial intelligence expert system derivation of preferred routes of travel, propositional calculus statements provided by one or more experts form the basis of route evaluation and selection. That information may be organized in multidimensional matrices as discussed above for artificial intelligence algorithmic evaluation and decision-making in desirable route selection.

In another embodiment of the present invention, the above described decision-making process may be augmented with the use of fuzzy logic. It is clear from the above discussion that the estimated travel time and energy needed parameter values will be variables with certain ranges of uncertainty. As described below, artificial intelligence expert systems using of fuzzy logic are particularly well-suited in deriving control rules for directing navigation of such vehicles with such uncertainty. It is to be understood that artificial intelligence expert system route derivation may be implemented without fuzzy logic as described above. The use of the above described expert defined propositional logic rules may be sufficient for some embodiments as described above. That said, fuzzy logic has found expanded uses in the development of sophisticated control systems. With this technology, complex requirements may be implemented in amazingly simple, easily managed and inexpensive controllers. It is a relatively simple method of representing analog processes on a digital computer. It has been successfully applied in a myriad of applications such as flight control systems, camera systems, antilock brakes systems, washing machines, elevator controllers, hot-water heaters, and stock trading programs.

The intelligent system matrix (700) of FIG. 7 and its associated propositional logic expressions may be used to formulate a fuzzy logic implementation of the electric vehicle control unit processing device (400) and/or cloud control unit (500) of FIGS. 4 and 5.

With fuzzy logic control, statements are written in the form of the propositional logic statements as illustrated above. These statements represent somewhat imprecise ideas reflecting the states of the variables. The variable ranges for energy needed and travel time indicated in FIG. 7 may be "fuzzified" as fuzzy logic variables extending over the defined overlapping ranges as shown, for example, in FIG. 9. Fuzzy logic systems make use of "fuzzifers" that convert input variables into their fuzzy representations. "Defuzzifiers" convert the output of the fuzzy logic process into "crisp" numerical values that may be used in system control.

Figure 9:
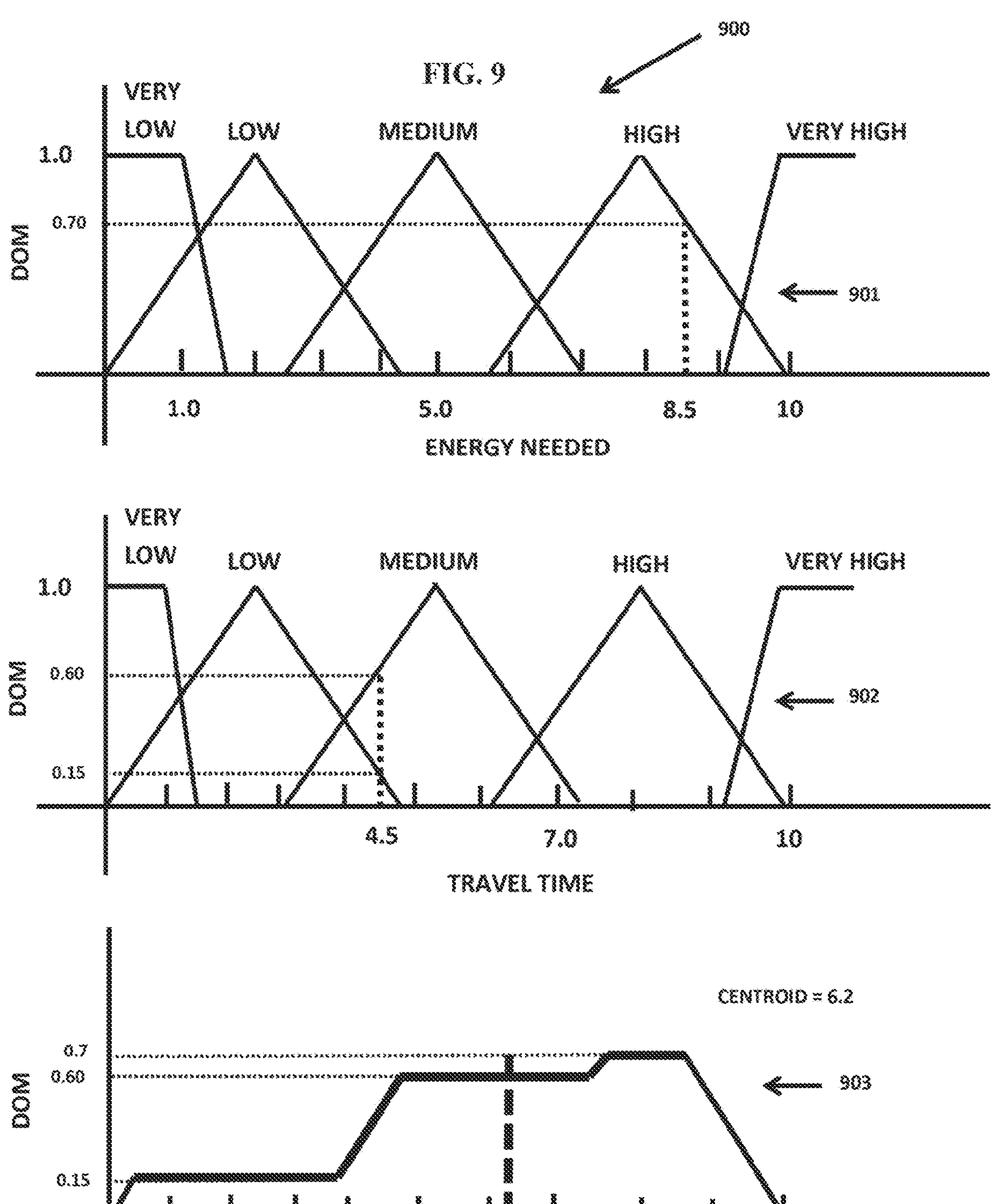
FIG. 9 illustrates, without limitation, exemplary artificial intelligence fuzzy logic calculations for the derivation of crisp numerical values ranking particular routes with varying placement of charging stations for the purpose of assisting determination of a particular route of travel for an electric vehicle in need of charging.

For example, the graph (901) of FIG. 9 illustrates such a possible "fuzzification" for the energy needed index variable with overlapping ranges indicated in the figure. In this example, on a scale of 1 to 10, the normalized energy needed for a particular route is rated at 8.5. Normalization may be accomplished, for example, by comparison to the maximum energy available from the EV battery source. As illustrated in the FIG. 9, an energy needed rating of 8.5 results in a degree of membership (DOM) of 0.70 in the membership class "high." In this particular example, the energy needed rating of 8.5 does not result in membership in any other of the possible membership classes.

In a similar way, in the graph (902) of FIG. 9 "fuzzification" of the travel time variable is illustrated. On a scale of 1 to 10, a normalized travel time value of 4.5 results in a DOM of 0.6 in the travel time "medium" membership class and 0.15 in the "low" membership class. In this case, for example, normalization may be accomplished by comparison to a user defined maximum allowable travel time.

These DOM values may in turn be used in the fuzzy logic implementation to derive a defined, "crisp" numerical value for a route advisory action index. For example, in the above example of FIG. 9, the two propositional logic statements "fire" as follows:

1. If energy needed is high and the travel time is medium then route desirability rating is low.
2. If energy needed is high and travel time is low then the route desirability rating is very low.

The conjunctive relation "and" corresponds to the logical intersection of the two sets corresponding to the energy and distance variables. In this case the appropriate DOM is the minimum DOM for each of the sets at the specified time. This is expressed algebraically as follows:

$$(A \cap B)(x) = \min(A(x), B(x)) \text{ for all } x \in X$$

Premises connected by an "OR" relationship are combined my taking the larger DOM for the intersection values. This is expressed algebraically as follows:

$$(A \cup B)(x) = \max(A(x), B(x)) \text{ for all } x \in X$$

In the case of the exemplary propositional logic equations above: "If energy needed is high and travel time is medium then route desirability rating is low." The conjunctive relation "and" requires the use of the minimum value of the respective DOM's. From the graphs (901) and (902), for these propositional logic equations the corresponding DOM's are 0.7 for the energy needed variable and 0.6 for the travel time variable. Correspondingly, consider the second propositional logic equation above: "If energy needed is high and travel time is low, then route desirability rating is low." In this case the corresponding DOM is 0.15 for the travel time variable.

These values may be used to defuzzify the route advisory index degree of membership. As shown in (903) of FIG. 9, fuzzy ranges for the route advisory index may be defined in a similar manner to the energy needed and travel time variables. A numerical "crisp" value for the advisory action index can now be derived using defuzzification procedures. As shown in FIG. 9, the DOM ranges for the route advisory index are capped at values corresponding to the above analysis for the DOMs of the energy needed and travel time variables. The final "crisp" numerical value of the route advisory index may, for example, be calculated based on the centroid of the geometric figure for the DOM ranges of the graph (903) of FIG. 9. This calculation may be carried out by dividing the geometric figure of FIG. 9 into sub-areas $A_i$ with individual centroids $x_i$ from the following formula.

$$x_c = \left(\sum_{i=1}^{n} x_i A_i\right) \Big/ \left(\sum_{i=1}^{n} A_i\right)$$

The result of such a calculation is shown in FIG. 9 yielding a route advisory index numerical value of 6.2.

While, for simplicity, the above example dealt with only two variables, namely user level of energy needed and travel time indices, the method described above may be expanded to more than two variables.

As discussed above, a calculation of the route advisory index may be made for several possible routes corresponding to battery replenishing stations in the vicinity of the electric vehicle. For example, separate calculations may be made for each of the routes A, B and C of FIG. 3 as discussed above. The route with the lowest route advisory index is then chosen for recommendation to the driver of the electric vehicle. Lower energy needed and/or lower route travel times will yield lower route advisory indices corresponding to more preferred routes. Such a decision may be displayed by the display of control unit 400 of FIG. 4. The control unit may also provide navigation information to the electric vehicle to guide it along the selected route according to well-known vehicle direction routing systems and methods.

Figure 10:
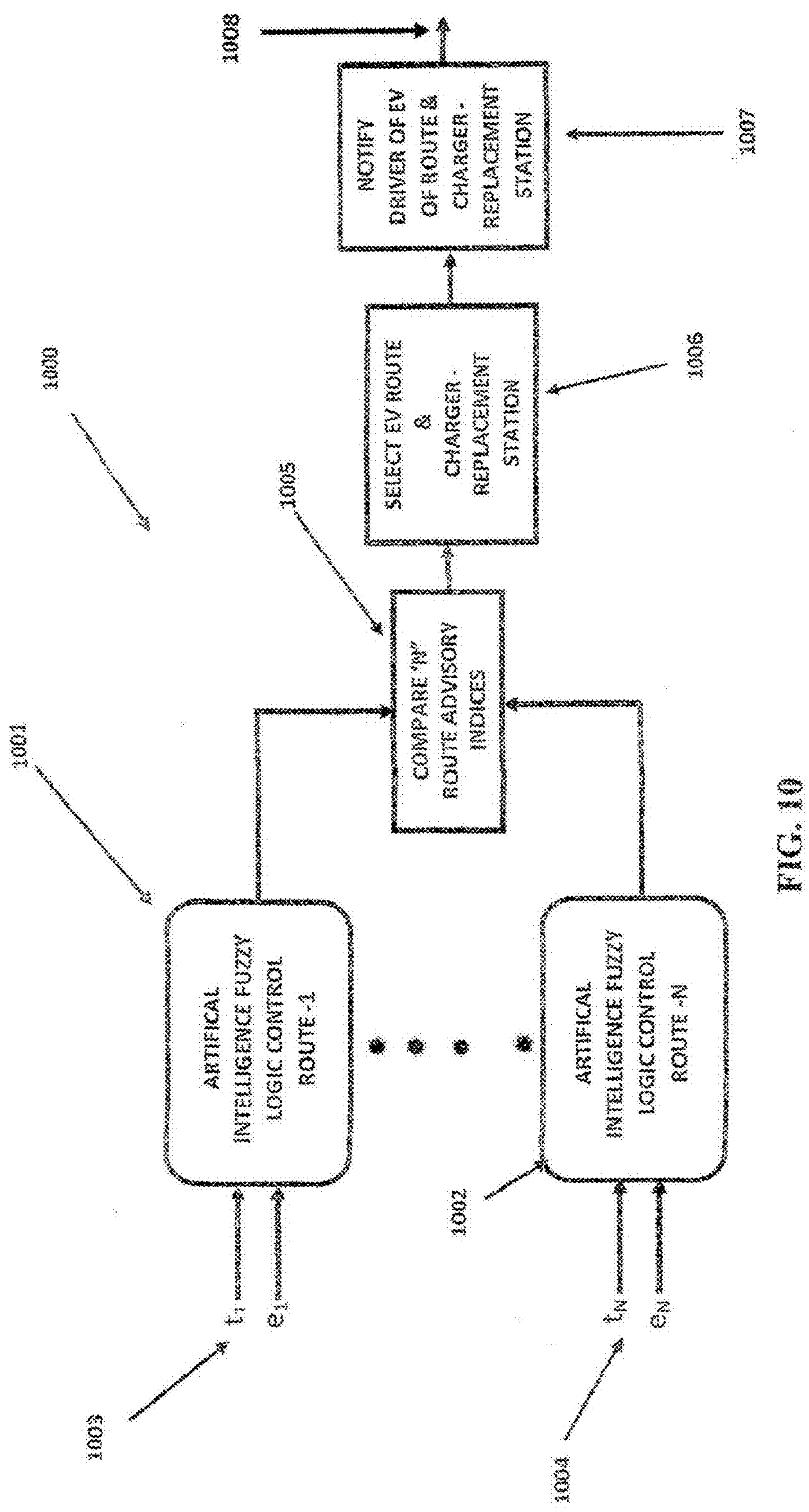
FIG. 10 illustrates, without limitation, an exemplary selection based on two input variables of a particular route from among several potential routes based on the crisp numerical values of the fuzzy logic calculations of FIG. 9 for the systems and methods of the present invention.

FIG. 10 illustrates a route selection process for the above described two input energy needed and travel time parameters for multiple routes. Parameters (1003) are input to the fuzzy control route selection (1001) for route 1 as indicated in the figure. Similarly, energy needed and travel time parameters for the $N^{th}$ route are input to the fuzzy control route calculation (1002) for route N, as shown in FIG. 10. The outputs from the multiple fuzzy logic control route selection calculations are input to the EV route and battery charger-replacement station selection units (1005) and (1006), where the most desirable route is chosen. The driver of the electric vehicle is then notified of the route and battery charger-replacement station selection at operation (1007) via output (1008).

Figure 11:
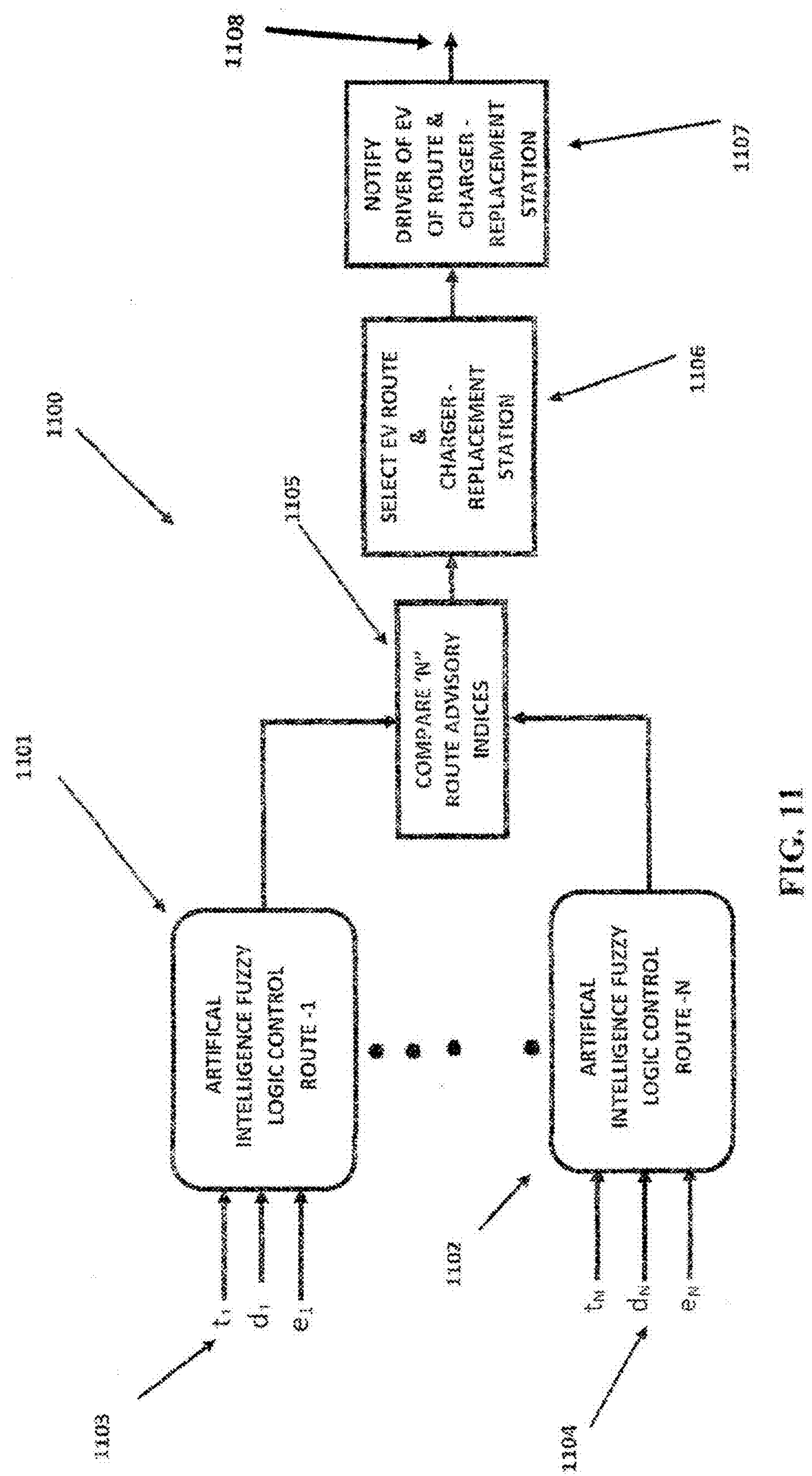
FIG. 11 illustrates, without limitation, an exemplary selection based on multiple input variables of a particular route from among several potential routes based on the crisp numerical values of fuzzy logic calculations for the systems and methods of the present invention.

FIG. 11 illustrates similar operation (1100) with three input variables at (1103) and (1004) for each route, including energy needed, distance to the destination and the travel time required to arrive at the destination. In this case, three input variables are used in the fuzzy logic control route selections at (1101) and (1102) with the selection of the best route at operation (1105) and (1106). Here again, the driver of the electric vehicle is notified of the route and battery replenishing station selection at (1107) via output (1108). Navigation along the selected route may commence as described above.

Figure 12:
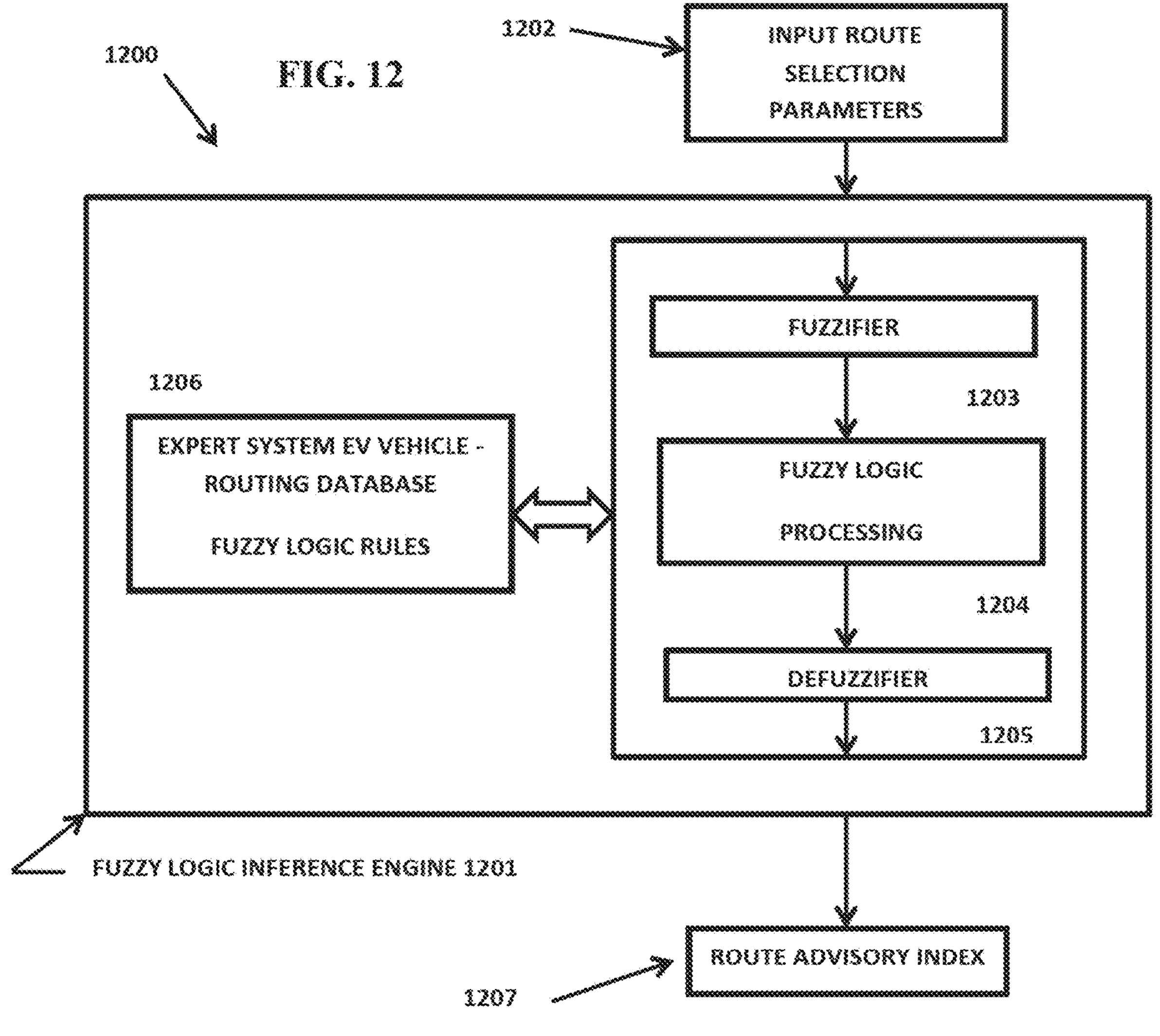
FIG. 12 illustrates, without limitation, an exemplary fuzzy logic inference engine useful in the systems and methods of the present invention.

FIG. 12 illustrates in more detail exemplary fuzzy logic operation execution (1200) by the device control unit (400) for the system and methods of this invention. As shown in FIG. 12, these operations of fuzzy logic inference engine (1201) include access to the artificial intelligence expert system knowledge base (1206) which may include the fuzzy logic rules discussed above. The fuzzy logic operations include the fuzzifier (1203) used to establish degree of memberships (DOMs) as discussed above. The outputs of fuzzifier (1203) are fed to the fuzzy logic processing element (1204). Defuzzifier (1205) provides crisp numerical outputs for the route advisory index (1207) to the EV control unit as discussed above.

Although the embodiments above have been described in considerable detail, numerous variations and modifications will become apparent to those skilled in the art once the above disclosure is fully appreciated. For example, embodiments with more or fewer variables to be analyzed as described above are possible. Variations of the artificial intelligence expert system analysis may be used including embodiments that do not use fuzzy logic. Embodiments for the EV control unit as described above may be integrated in various degrees with other motor vehicle telematics or system control processors and sensor systems. In some embodiments, the EV control unit may include only a subset of the capabilities discussed above. In some embodiments, the EV control unit may include additional capabilities not shown herein. While the above disclosure is based on a standard EV vehicles, the same teachings set forth herein may be applied to other vehicles such as trucks, buses, military vehicles, emergency vehicles such as fire trucks and ambulance and the like. It is intended that the following claims be interpreted to embrace all such variations and modifications.

The embodiments of the invention in which an exclusive property or privilege is claimed are defined as follows:

1. An artificial intelligence (AI) Electric Vehicle (EV) route optimization system for an EV comprising:

an electronic, specifically programmed, communication computer AI system performing EV route optimization for travel of said EV from a designated origin location or EV present location to an EV designated destination location to maintain EV battery charge levels with intermediate stops at intervening battery charging stations;

EV route optimization further comprising route evaluation based upon battery charging station usage and actual or probable requests for battery charging route guidance from other EVs traveling within a defined distance from said EV present location;

a memory for storing one or more EV attribute parameters comprising EV operational status parameters, EV location parameters, or EV battery status parameters;

telecommunication system connections for receipt of EV potential route condition parameters for said EV based on information exchanges with at least two of: (1) communication network connections with application servers, (2) communication network connections with other motor vehicles, (3) communication network connections with pedestrians, or (4) communication network connections with roadside monitoring and control units;

memory for storing expert defined propositional logic inference rules specifying multiple multidimensional conditional relationships between two or more of said EV attribute parameters and EV potential route condition parameters, and for storing expert defined individual EV attribute parameter and EV potential route condition parameter degree of danger value ranges that depend on individual parameter importance to EV route optimization;

AI expert system evaluation of EV potential routes of travel from said EV designated origin location or EV present location to said EV designated destination location based on said EV attribute parameters, said EV potential route condition parameters and said expert defined propositional logic inference rules with selection of a particular route of travel based on evaluation of one or more multidimensional combinations of two or more interrelated multidimensional parameters of said EV attribute parameters and said EV potential route condition parameters.

2. The system of claim 1, wherein said range dependent propositional logic inference rules comprises an AI expert system mathematical algorithm through which running a set of input data can generate a set of inference outputs.

3. The system of claim 2, wherein said set of inference outputs comprise expert predictions of said outputs.

4. The system of claim 1, wherein said range dependent propositional logic inference rules comprise operational models for different inference requirements and capabilities depending on application conditions.

5. The system of claim 4, wherein said application conditions comprise different routes of travel.

6. The system of claim 4, wherein said application conditions comprise driver history information.

7. The system of claim 4, wherein said operational models for different inference requirements and capabilities depending on application conditions comprise models with two input data variables for each of said different routes of travel.

8. The system of claim 4, wherein said operational models for different inference requirements and capabilities depending on application conditions comprise models with multiple input data variables for each of said different routes of travel.

9. The system of claim 8, wherein said operational models comprise multiple models providing outputs in parallel as input to additional model operations.

10. The system of claim 8, wherein said operational model inputs comprise one or more of time to destination, distance to destination, or energy required for said EV to reach said destination.

11. The system of claim 1, wherein said specifically programmed communication computer system comprises multiple EV radio communication devices with operations in multiple RF frequency bands.

12. The system of claim 1, wherein the specifically programmed communication computer system comprises communication and information processing operations with EV equipment.

13. The system of claim 1, wherein the specifically programmed communication computer system comprises EV computation and control equipment and external remote processing equipment.

14. The system of claim 13, wherein said external remote processing equipment further comprises cloud computing and data storage equipment.

15. The system of claim 13, wherein the specifically programmed communication computer system comprises a distributed communication computing system.

16. The system of claim 15, wherein said distributed communication computing system comprises remote processing, computing, and control for connection and communication control with said (1) communication network connections with application servers, (2) communication network connections with other motor vehicles, (3) communication network connections with pedestrians, or (4) communication network connections with roadside monitoring and control units.

17. The system of claim 16, wherein said distributed communication computing system provides communication connections with selected remote application servers, other motor vehicles, pedestrians, or roadside monitoring and control units.

18. The system of claim 17, further comprising selective switching of said communication connections between a subset of different remote application servers, other motor vehicles, other pedestrians, or other roadside monitoring and control units.

19. The system of claim 18, wherein said communication connections comprise Internet or Internet of Things (IoT) connections.

20. The system of claim 18, wherein said communication connections comprise cellular communication network connections.

* * * * *